(12) United States Patent
Urakami

(10) Patent No.: US 11,022,158 B2
(45) Date of Patent: Jun. 1, 2021

(54) DEVICE CAPABLE OF ADHERING BY SUCTION TO OBJECT SURFACE AND TRAVELING THEREALONG

(71) Applicant: URAKAMI LLC, Kanagawa (JP)

(72) Inventor: Fukashi Urakami, Kanagawa (JP)

(73) Assignee: URAKAMI LLC, Kanagawa (JP)

(*) Notice: Subject to any disclaimer, the term of this patent is extended or adjusted under 35 U.S.C. 154(b) by 0 days.

(21) Appl. No.: 16/789,542

(22) Filed: Feb. 13, 2020

(65) Prior Publication Data
US 2020/0182273 A1 Jun. 11, 2020

Related U.S. Application Data

(63) Continuation of application No. PCT/JP2018/030231, filed on Aug. 13, 2018.

(30) Foreign Application Priority Data

Aug. 21, 2017 (JP) .............................. JP2017-158682

(51) Int. Cl.
F16B 47/00 (2006.01)
F16B 1/00 (2006.01)

(52) U.S. Cl.
CPC ........ *F16B 1/00* (2013.01); *F16B 2001/0035* (2013.01)

(58) Field of Classification Search
CPC .... F16B 47/00; F16B 1/00; F16B 2001/0035; B08B 3/024; B62D 57/032; B62D 57/024
See application file for complete search history.

(56) References Cited

U.S. PATENT DOCUMENTS 4,674,949 A 6/1987 Kroczynski
5,069,234 A * 12/1991 Nielsen .................. B08B 9/023
134/113

(Continued)

FOREIGN PATENT DOCUMENTS

JP H3-69668 B2 11/1991
JP 2689127 B2 8/1997

(Continued)

OTHER PUBLICATIONS

International Search Report for the PCT patent application No. PCT/JP2018/030231 issued by ISA/JPO dated Feb. 19, 2019.

*Primary Examiner* — Amy J. Sterling
(74) *Attorney, Agent, or Firm* — Kubotera & Associates, LLC

(57) ABSTRACT

A device is at least formed from a suction unit, Y-axis reciprocating units, Z-axis reciprocating units, double-acting leg members, second Z-axis reciprocating units, and second double-acting leg members. As a first step for enabling the device to travel along an object surface, the double-acting leg members are strongly pressed against the object surface. As a second step, the suction unit is moved in the traveling direction of the device with the double-acting leg members strongly pressed against the object surface. As a third step, the double-acting leg members are separated from the object surface. As a fourth step, with the double-acting leg members separated from the object surface, the double-acting leg members are moved in the traveling direction of the device and returned to the state immediately prior to the first step. Thereafter, the actions of the first to fourth steps are repeated.

8 Claims, 31 Drawing Sheets

(56) References Cited

U.S. PATENT DOCUMENTS

| | | | | |
|---|---|---|---|---|
| 5,651,156 A | * | 7/1997 | Oomura | ............. B05B 13/0436 |
| | | | | 15/21.1 |
| 7,076,335 B2 | * | 7/2006 | Seemann | ............... B62D 55/00 |
| | | | | 700/248 |
| 2016/0363160 A1 | | 12/2016 | Urakami | |

FOREIGN PATENT DOCUMENTS

| | | |
|---|---|---|
| JP | 2805614 B2 | 7/1998 |
| JP | H11-79019 A | 3/1999 |
| JP | 2015-145060 A | 8/2015 |

\* cited by examiner

DEVICE CAPABLE OF ADHERING BY SUCTION TO OBJECT SURFACE AND TRAVELING THEREALONG

CROSS-REFERENCE TO RELATED APPLICATIONS

This is a continuation application of a prior PCT application No. PCT/JP/2018/030231 filed on Aug. 13, 2018.

TECHNICAL FIELD

This invention relates to a "device capable of adhering to an object surface and moving therealong" which can adhere to a surface of an object like a steel structure like a hull, a tank of every kind, a bridge and piping, or a concrete structure like a tank of every kind, a building, a cistern, a bridge and piping, by using an adhering unit like a vacuum sucker capable of adhering to the object surface, or which renders an action to the object surface like jetting a surface-treating material or obtaining information from the object surface for inspection thereof, while adhering to the object surface and moving therealong.

BACKGROUND OF THE INVENTION

A publicly-known technology of this kind has been laid out by the inventor of this invention in "Device Adhering to Wall Surface and Movable therealong" of Japanese Patent Publication No. 2689127, and "Device Adhering to Wall Surface and Movable therealong" of Japanese Patent Publication No. 2805614.

The device mentioned above comprises: a device body; wheels mounted on the device body to serve as a moving means; a negative pressure suction seal connected to the device body with its free end being brought into contact with the object surface, and rotatable around a rotational axis perpendicular to the body surface; a negative pressure generating means for discharging to the outside the fluid inside a decompressed area confined by the device body, the object surface and the negative pressure suction seal; and a vacuum breaking valve for maintaining the negative pressure at an arbitrary value by allowing surrounding fluid to flow into the decompressed area when the negative pressure inside the decompressed area increases to reach or exceed the arbitrary value of pressure, or in other words, a relief valve or so-called a vacuum breaker, in general, for keeping a vacuum pressure constant.

The relief valve is not necessarily attached directly to the device body, but may be attached to a proximity part of a suction hose, connecting the device body to the negative pressure generating means, near the device body.

In the device like this, when the negative pressure generating means is energized, the fluid inside the decompressed area is discharged to the outside. Fluid pressure applied to the device body due to the difference in fluid pressure between the inside and the outside of the decompressed area is transmitted to the object surface by the intermediary of the wheels, and the device is allowed to adhere to the object surface by the fluid pressure. When the wheels are rotationally driven by a driving means like an electric motor in the adhering state like this, the device is moved along the object surface by the action of the wheels.

Further, when the negative pressure suction seal with a polishing member like a polishing cloth mounted thereon is rotated, the object surface is polished and cleaned. In addition, the dust generated during the polishing and cleaning work is suctioned and recovered by the action of the negative pressure generating means.

The device like this can safely and efficiently perform various cleaning works on the object surface by means of remote control without generating dust.

Patent Document 1: Japanese Patent Publication No. 2689127
Patent Document 2: Japanese Patent Publication No. 2805614
Patent Document 3: Japanese Patent Application No. 2014-247953

SUMMARY OF THE INVENTION

The above-mentioned "Device Adhering to Wall Surface and Movable therealong" disclosed in the Japanese Patent Publication No. 2689127 and the Japanese Patent Publication No. 2805614 has following problems to be solved.

Namely, the "Device Adhering to Wall Surface and Movable therealong" is easy to travel continuously because a rotational driving means like the electric motor is equipped. On the other hand, in order to achieve intermittent traveling in which the device suspends after traveling a predetermined distance, resumes traveling the predetermined distance after a predetermined suspension time elapses and repeats the actions thereafter, a displacement sensor like a servo motor or a rotary encoder, and an electric control system are needed, which increase the cost of the device.

Further, the wheels provided with a rotary shaft and a bearing, the servo motor with a reduction gear, and a transmission mechanism transmitting the rotational driving force of the motor to the wheels have substantial weight. In the meantime, in the device of this invention, a working device working on the objet surface like jetting a surface treating material, or an inspection device for obtaining information from the object surface for inspection of the object surface needs to reciprocate in the direction intersecting with the traveling direction of the device of the invention and along the object surface to perform scanning of the object surface.

A traveling mode needed for the device of the invention is as follows. Namely, as a first step, outward scanning is performed by the working device or the inspection device, as a second step, the device suspends after traveling a predetermined distance, as a third step, homeward scanning is performed by the working device or the inspection device, as a fourth step, the device suspends after traveling a predetermined distance, and the steps 1 to 4 are repeated thereafter. The intermittent traveling mode as mentioned above is required.

Accordingly, a problem to be solved by this invention is to provide "a device capable of adhering to an object surface and traveling therealong" having a simple structure and reduced weight, incurring lower manufacturing cost, and capable of intermittent traveling with high positional accuracy.

The inventor of the present application has proposed a solution in Japanese Patent Application No. 2014-247953 to solve the problem, but in the present application, proposes a more advanced solution.

Hereinafter, means to solve the above-mentioned problem will be described.

Japanese Patent Application No. 2014-247953 proposes a means for to solve the above-mentioned problem.

Means further added and advanced in the present application will be described below in comparison with Japanese Patent Application No. 2014-247953.

Considering the shape and the function of the negative pressure adhering unit seal 202 required for the device capable of adhering to the object surface using negative pressure and traveling along the object surface (hereinafter referred to as the negative pressure adhering and traveling device), the function of the seal 202 is to provide the function to adhere to the object surface for the negative pressure adhering and traveling device.

That is, in order to create a negative pressure area connected to the suction pump inside the negative pressure adhering and traveling device, the seal 202 contacts the object surface and prevents the fluid such as air outside the device from entering the inside of the negative pressure area as much as possible, thus the negative pressure area is generated inside the negative pressure adhering and traveling device.

On the surface of the object, there are irregularities due to rust and projections such as welding seam lines, and in order for the seal 202 to maintain the above-described function, hardly any gap must be removed between the seal 202 and the object surface.

As described above, it is important that the seal 202 can be freely deformed in accordance with the unevenness of the surface of the object.

Therefore, the seal 202 is made of a flexible material such as polyurethane, and its shape is required to be a shape that can be deformed flexibly.

It should be noted that the inventor of the present application has disclosed in Japanese Patent No. 1323843, etc., for details of a sealing technique for generating a negative pressure area in the negative pressure adhering and traveling device.

Referring to the negative pressure adhering unit seal 202 disclosed in Japanese Patent Application No. 2014-247953, FIG. (a) of FIG. 12 of the present application shows FIG. 4 of Japanese Patent Application No. 2014-247953, and FIG. (b) of FIG. 12 of the present application shows FIG. 5 of Japanese Patent Application No. 2014-247953, and FIG. (c) of FIG. 12 of the present application shows FIG. 6 of Japanese Patent Application No. 2014-247953.

In FIG. (a) of FIG. 12 of the present application, FIG. (b) of FIG. 12 of the present application showing a partial cross section of the FIG. (a), and FIG. (b) of FIG. 13 of the present application showing a partially enlarged cross section of the FIG. (b), it is showed that the shape of the negative pressure adhering unit seal 202 is in a standard state, which is neither the maximum contracted state nor the maximum expanded state.

If the standard state is described as a coil spring, assume that the coil spring is in a free state.

In FIG. 12($c$) of the present application and FIG. 13($a$) of the present application showing a partially enlarged cross section of FIG. 12($c$), the shape of the negative pressure adhering unit seal 202 is in the maximum contracted state.

In FIG. 13($c$) of the present application, the shape of the negative pressure adhering unit seal 202 is in the maximum extended state.

FIG. 13($a$) of the present application shows that the seal 202 is in a maximum contracted state which is the limit area of the "deformable area of the seal 202".

FIG. 13($c$) of the present application shows that the seal 202 is in the maximum extension state which is the limit area of the "deformable area of the seal 202".

If the seal 202 is deformed outside the "deformable area of the seal 202", the function of the seal 202 is destroyed and the negative pressure adhering and traveling device separates from the surface of the object, that is, when the surface of the object is a wall surface or a ceiling surface, the device falls to the ground.

If the seal 202 is in the state of FIG. 12($c$) of the present application or in the state of FIG. 13($a$) of the present application showing a partially enlarged cross section of the FIG. 12$c$), that is, if the seal 202 is in the maximum contracted state, the seal 202 is deformed outside the "deformable area of the seal 202" and therefore the function of the seal 202 is destroyed and the negative pressure adhering and traveling device separates from the surface of the object if there is a concave on the surface of the object, and if the second double-moving leg member 203 fits in the concave.

That is, in consideration of the fact that there is the concave on the surface of the object, it is desirable that the shape of the seal 202 is maintained the shape in the standard state shown in FIG. 13($b$) of the present application.

In Japanese Patent Application No. 2014-247953, the members that determine the shape of the seal 202 are the second double-moving leg member 203 and the double acting leg member 8.

If the level of the surface of the double-acting leg member 8 that contacts the object surface is the same level as the level of the object surface, the second double-moving leg member 203 comes into contact with the convex portion of the object surface and hinders the traveling function of the device.

Therefore, the level of the surface of the double-acting leg member 8 is needed to be arranged at a position farther from the object surface.

However, if the seal 202 is disposed at the position father from the object surface, there is a risk that the seal 202 will deviate from the maximum contracted state.

In the present application, the members that determine the shape of the seal 202 are the second double-acting leg member 203 and the double-acting leg member 8.

By the action of the second Z-axis reciprocating unit, the second double-acting leg member 203 can be expanded and contracted at optional time in the Z-axis direction, that is, the direction intersecting the object surface.

That is, if the level of the surface of the second double-acting leg member 203 that contacts the object surface and the level of the surface of the double-acting leg member 8 that contacts the object surface are basically set to the same level of the surface, in addition, if the surface of the second double-acting leg member 203 is retracted to a position away from the object surface while traveling on the object surface of the negative pressure adhering and traveling device, there is no risk that the seal 202 will deviate from the maximum contracted state due to that the second double-moving leg member 203 contacts the convex portion of the object surface and hinders the traveling function of the device.

As described above, the present application proposes a solution that is more advanced than the solution disclosed in Japanese Patent Application No. 2014-247953 to solve the problem.

In order to solve the above-mentioned problem, according to the first invention related to this invention, "a device capable of adhering to an object surface and traveling therealong" as described in claim 1, for example, is provided.

Namely, the device capable of adhering to the object surface and traveling therealong comprising:

where axes parallel to the object surface and perpendicular to each other are referred to as X-axis and Y-axis, and an axis perpendicular to the object surface is referred to as Z-axis;

an adhering unit adhering to the object surface by the action of negative pressure;

Y-axis reciprocation units respectively arranged on right and left sides of the adhering unit with respect to the moving direction thereof, and capable of reciprocating optionally in a front-back direction of the moving direction, that is, in the Y-axis direction;

Z-axis reciprocation units mounted on each of the Y-axis reciprocation units and capable of reciprocating optionally in the direction intersecting with the object surface, that is, in the Z-axis direction;

double-acting leg members respectively mounted on the Z-axis reciprocation units, and capable of reciprocating optionally in the direction intersecting with the object surface, that is, in the Z-axis direction;

second Z-axis reciprocation units mounted on the adhering unit and capable of reciprocating optionally in the Z-axis direction;

and second double-acting leg members respectively mounted on the second Z-axis reciprocation units, and capable of reciprocating optionally in the Z-axis direction;

wherein, when the device travels in the Y-axis direction along the object surface adhering to the object surface;

as a first step; while maintaining the default state that the double-acting leg members are separated from the object surface by the action of the Z-axis reciprocation units, the second double-acting leg members are strongly pressed against the object surface by the action of the second Z-axis reciprocation units; the double-acting leg members is moved in the traveling direction of the device by driving the Y-axis reciprocation units;

as a second step, the double-acting leg members are strongly pressed against the object surface by the action of the Z-axis reciprocation units, and the second double-acting leg members are separated from the object surface by the action of the second Z-axis reciprocation units;

as a third step, the adhering unit adhering to the object surface is moved in the traveling direction of the device by driving the Y-axis reciprocation units while maintaining the state that the double-acting leg members are strongly pressed against the object surface and the second double-acting leg members are separated from the object surface;

as a fourth step, the double-acting leg members are separated from the object surface by the action of the Z-axis reciprocation units and the second double-acting leg members are strongly pressed against the object surface by the action of the second Z-axis reciprocation units, thus it is returned to the state immediately before the first step, that is, it is returned to the default state;

and the operations of the first to fourth steps are repeated thereafter, by which the device adhering to the object surface travels intermittently therealong.

Note that the definition of the "default state" in the present invention is as follows.

When the state of the device changes to a plurality of states and the mode of the change is repeated, the state arbitrarily selected from the plurality of states is referred to as "default state".

The first invention related to this invention brings about the following effects.

Namely, in the "device capable of adhering by suction to an object surface and traveling therealong" by using negative pressure as described in claims 1 to 3, since an expensive displacement sensor like a servo motor or a rotary encoder, and an electric control system are not needed and the configuration and control are simplified, the manufacturing cost can be reduced. In addition, failures are reduced and the maintenance is facilitated as the configuration and control are simplified.

Further, heavy parts like wheels with a rotary shaft and a bearing, the servo motor with a reduction gear, a transmission mechanism transmitting the rotational driving force of the motor to the wheels, etc., are not needed. Thus, since the configuration is simple and the whole device is lightweight, the device is easily used and become more convenient.

Furthermore, since positional accuracy during intermittent traveling is improved, work quality can be improved when jetting a surface treatment material, etc., or inspection, etc., of the object surface.

In the present application, in addition to the effects of the above invention described in Japanese Patent Application No. 2014-247953, the following effects are further added.

That is, if the level of the surface of the second double-acting leg member 203 that contacts the object surface and the level of the surface of the double-acting leg member 8 that contacts the object surface are basically set to the same level of the surface, in addition, if the surface of the second double-acting leg member 203 is retracted to a position away from the object surface while traveling on the object surface of the negative pressure adhering and traveling device, there is no risk that the seal 202 will deviate from the maximum contracted state due to that the second double-moving leg member 203 contacts the convex portion of the object surface and hinders the traveling function of the device.

BRIEF DESCRIPTION OF THE DRAWINGS

FIG. 11 is a rear view, a bottom view and a partial cross-sectional view of the device shown in FIG. 1 showing the state of the device immediately before the first step in the drawing showing the steps in which a working device or an inspection device scans the object surface and the entire device travels along the object surface, in.

DETAILED DESCRIPTIONS OF THE PREFERRED EMBODIMENTS

Preferred embodiments of the device configured according to the first invention related to this invention will be explained in detail hereinafter referring to the accompanying drawings.

Figure 1:
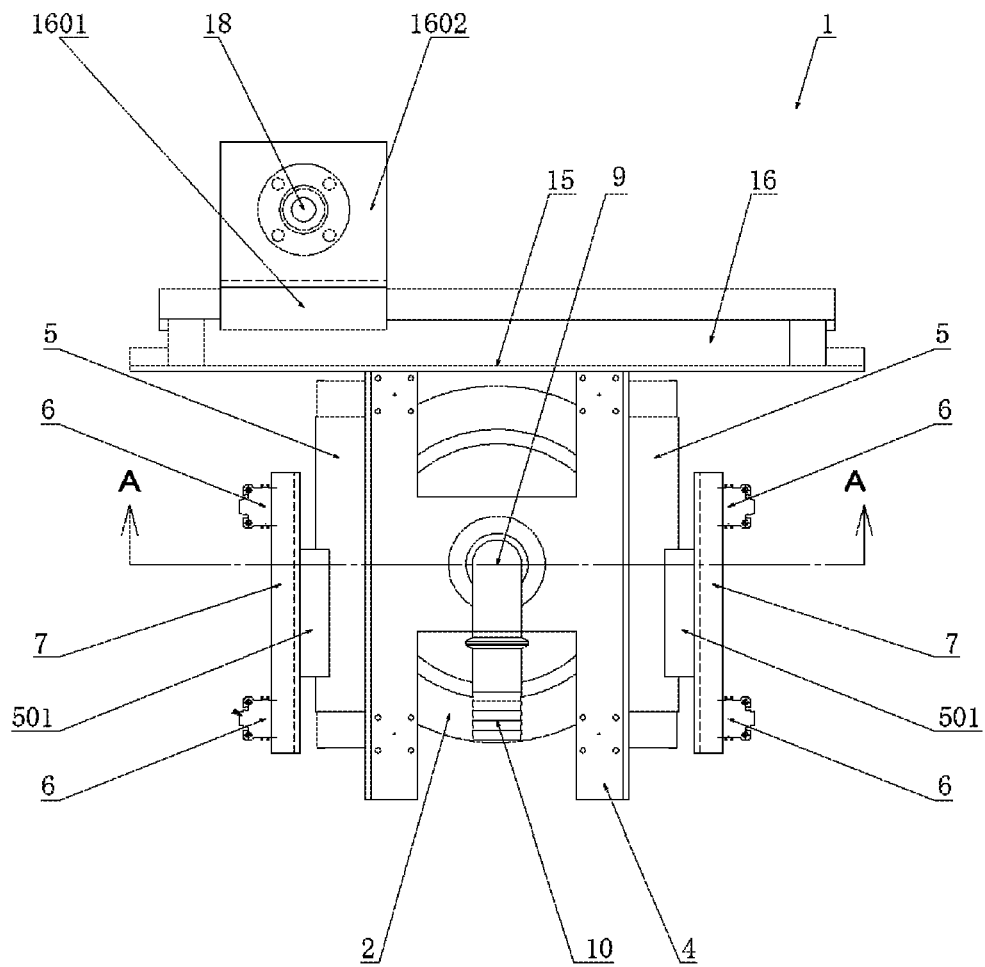
FIG. 1 is a front view showing a first preferred embodiment of the device configured according to this invention.
Figure 2:
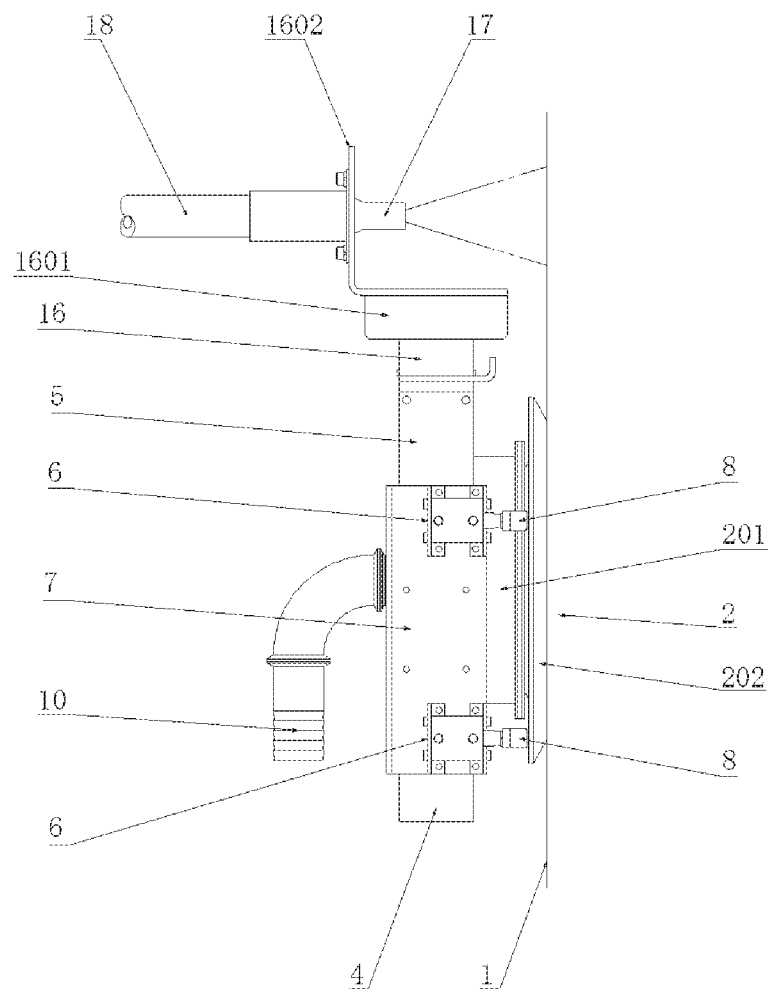
FIG. 2 is a right-side view of the device shown in FIG. 1.
Figure 3:
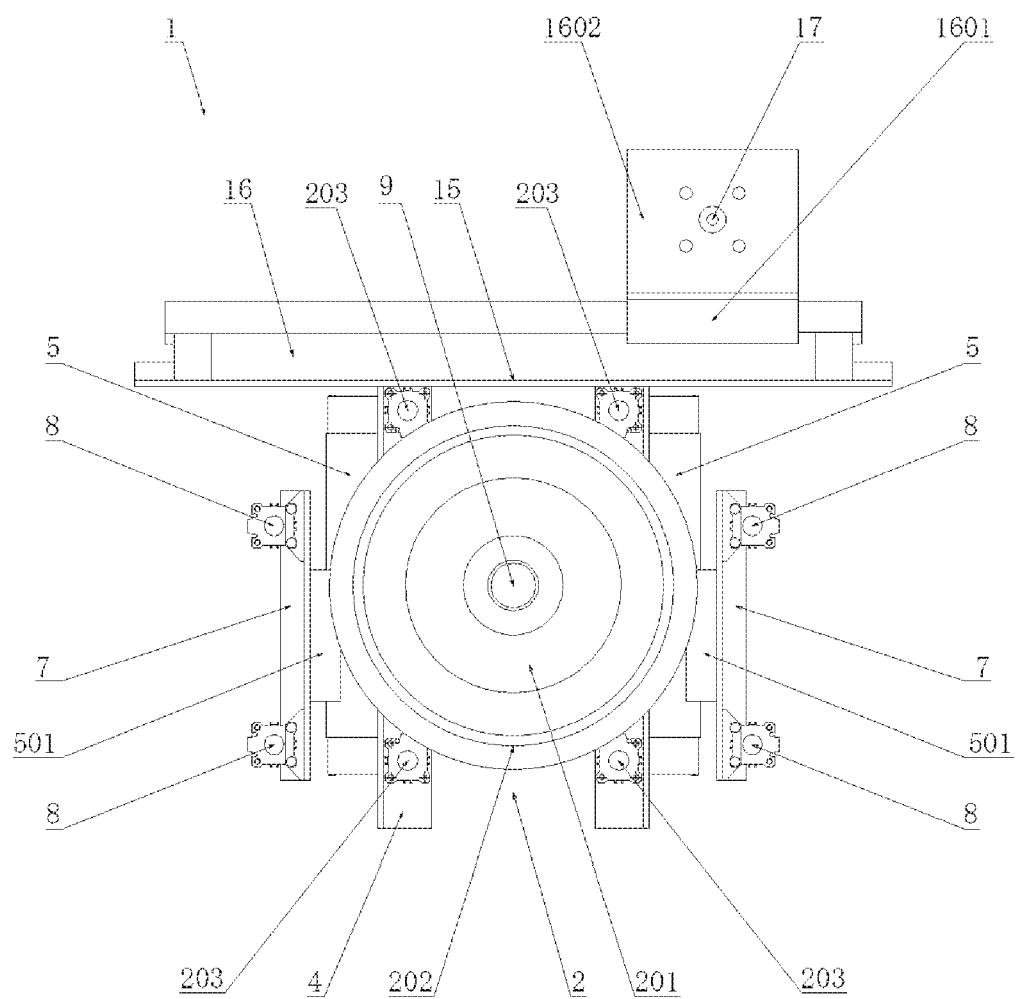
FIG. 3 is a rear view of the device shown in FIG. 1 and seen from the direction of an object surface.
Figure 4:
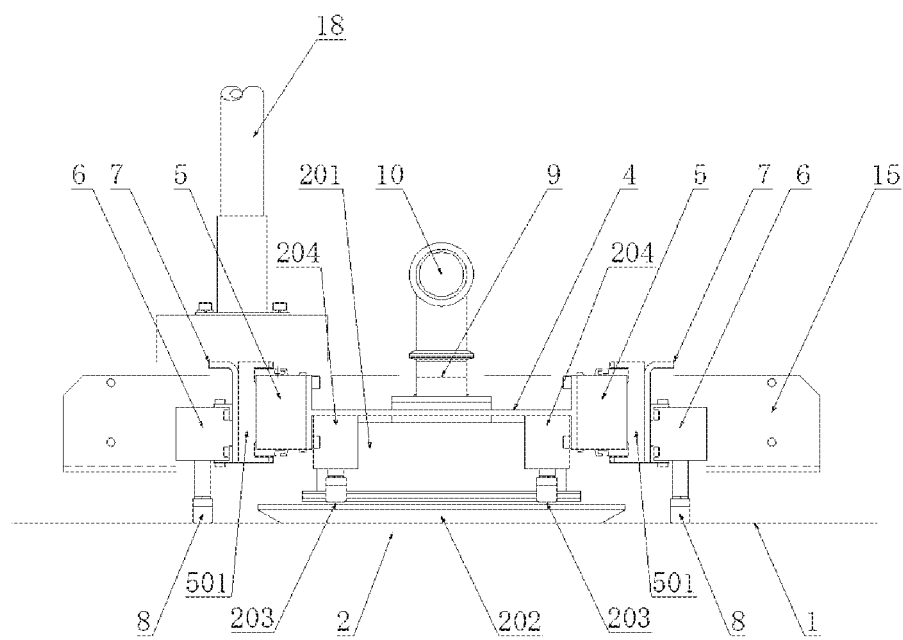
FIG. 4 is a bottom view of the device shown in FIG. 1.
Figure 5:
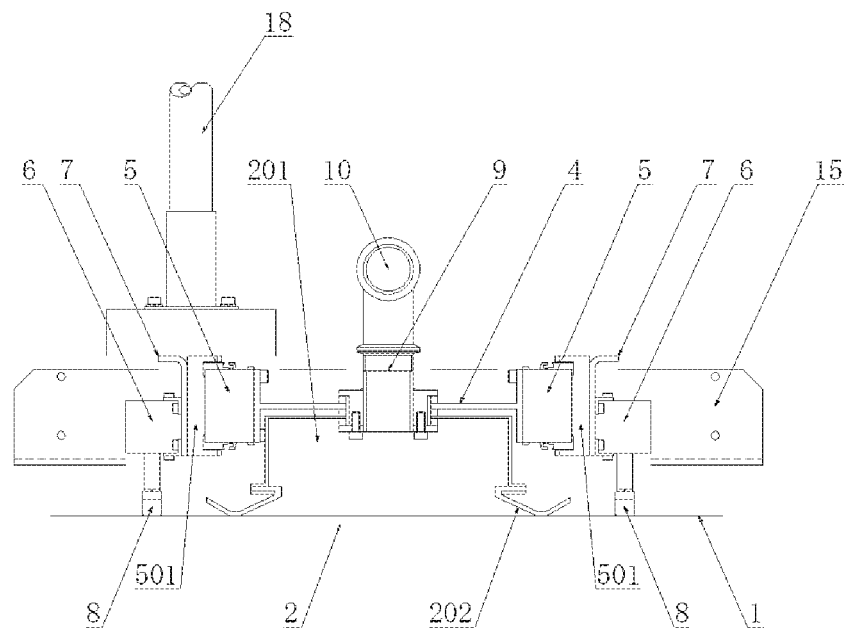
FIG. 5 is a cross-sectional view of the device shown in FIG. 1 taken along a line A-A.
Figure 6:
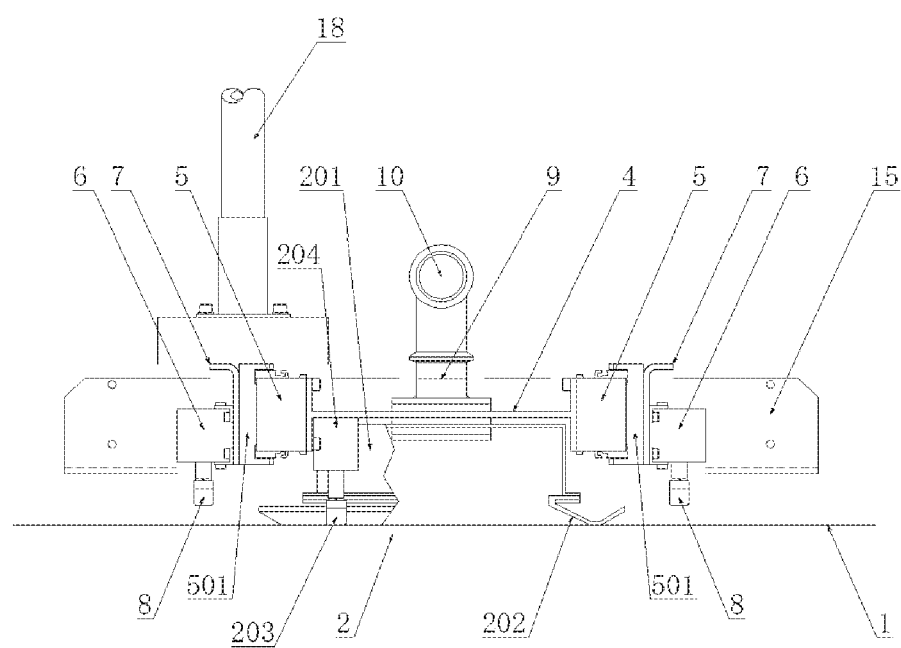
FIG. 6 is a bottom view and a partial cross-sectional view of the device shown in FIG. 1 taken along the line A-A showing the state in which double-acting leg members of a Z-axis reciprocation unit is separated from an object surface.

FIG. 1 is a front view of the device of the preferred embodiment and the object surface 1 seen from the direction away from the object surface 1, showing the state that the device of the preferred embodiment adheres to the object surface 1, i.e., a wall surface, by negative pressure.

In FIG. 1, the device of the preferred embodiment (hereinafter referred to as "entire device") travels upward and downward, and rotates clockwise and counterclockwise along the object surface 1. When members configuring the entire device are referred, a left-side part is referred to as left, and the right-side part is referred to as right.

The axes parallel to the object surface and orthogonal to each other are referred to as X-axis and Y-axis, and the axis orthogonal to the object surface is referred to as Z-axis.

The entire device will be explained hereinafter with reference to FIGS. 1 to 6.

The device shown in the FIGS. is provided with a main frame 4. The main frame 4 is formed into an H-shape in FIG. 1.

The Y-axis reciprocation units 5 respectively comprising rodless cylinders are respectively mounted on a left-side face and a right-side face of the main frame 4.

Z-axis reciprocation unit frames 7 are mounted on motion members 501 of the Y-axis reciprocation units 5.

Two Z-axis reciprocation units 6 comprising reciprocation cylinders are mounted on the Z-axis reciprocation unit frames 7.

Double-acting leg members 8 mainly made from polyurethane are mounted on front ends of piston rods of the Z-axis reciprocation units 6.

A negative pressure adhering unit 2 is mounted on a center part of the main frame 4 by the intermediary of a hollow rotary coupling means 9 in a rotatable manner along the object surface 1.

The negative pressure adhering unit 2 comprises a negative pressure adhering unit casing 201 having a cylindrical shape opening to the object surface 1, a negative pressure adhering unit seal 202 formed into a ring-like shape using polyurethane as its material and flared toward the object surface 1 like a trumpet, and negative pressure adhering unit fixing legs 203 mainly made from polyurethane.

The negative pressure adhering unit fixing legs 203 are the members for keeping a gap between the object surface 1 and an end part of the negative pressure adhering unit casing 201 constant when the gap is minimum.

When the negative pressure adhering and traveling device 2 travels along the object surface 1, the piston rod of the second Z-axis reciprocating unit 204 set back and the second double-acting leg member 203 departs from the object surface 1.

When the negative pressure adhering and traveling device 2 does not travel along the object surface 1, the piston rod of the second Z-axis reciprocating unit 204 extends and the second double-acting leg member 203 is pressed against the object surface 1.

A suction hose joint 10 is fitted to the hollow rotary coupling means 9.

A negative pressure generating means (not shown) like a vacuum pump is connected to the suction hose joint 10 by the intermediary of a suction hose (not shown).

A work frame 15 is welded to an upper end of the main frame 4.

A second Y-axis reciprocation unit 16 comprising the rodless cylinder is mounted on the work frame 15.

A polishing and cleaning material blast nozzle 17 is mounted on a motion member 1601 of the second Y-axis reciprocation unit 16 by the intermediary of a nozzle mounting member 1602.

A polishing and cleaning material pressure-feeding device (not shown) is connected to the polishing and cleaning material blast nozzle 17 by the intermediary of a polishing and cleaning material pressure-feeding blast hose 18.

A working device like a coating gun or a thermal spraying gun working on the object surface, or a sensor obtaining information from the object surface like an ultrasonic flaw detector can be mounted on the motion member 1601 of the second Y-axis reciprocation unit 16 instead of the polishing and cleaning material blast nozzle 17.

Operation and effects of the above-mentioned device will be explained hereinafter.

When the negative pressure generating means (not shown) is energized, the atmosphere-like fluid in the negative pressure adhering unit 2 is discharged to the outside through the suction hose joint 10 and the suction hose (not shown), and the inside of the negative pressure adhering unit 2 is decompressed as required.

When the inside of the negative pressure adhering unit 2 is decompressed, the entire device adheres to the object surface 1 by the pressure of the surrounding fluid like the atmosphere acting on the negative pressure adhering unit 2 due to the difference in fluid pressure between the inside and the outside of the negative pressure adhering unit 2.

When the pressure inside the negative pressure adhering unit 2 is maintained at a required pressure, the negative pressure adhering unit seal 202 is brought into tight contact to the object surface 1 due to the difference in pressure between the inside and the outside of the negative pressure adhering unit 2. Accordingly, the fluid outside the negative pressure adhering unit 2 is prevented from flowing inside to the utmost.

Mixed fluid of the polishing and cleaning material and the compressed air, or mixed fluid of the polishing and cleaning material and high-pressure water is jetted powerfully from the polishing and cleaning material blast nozzle 17 to the object surface 1 so that rust, degraded paint or the like adhering to the object surface 1 can be removed.

The polishing and cleaning material blast nozzle 17 reciprocates in a direction crossing the traveling direction of the entire device by the action of the second Y-axis reciprocation unit 16.

Steps for scanning the object surface 1 by the polishing and cleaning material blast nozzle 17 and traveling of the entire device along the object surface 1 will be explained below with reference to FIGS. 7 to 11.

Figure 11:
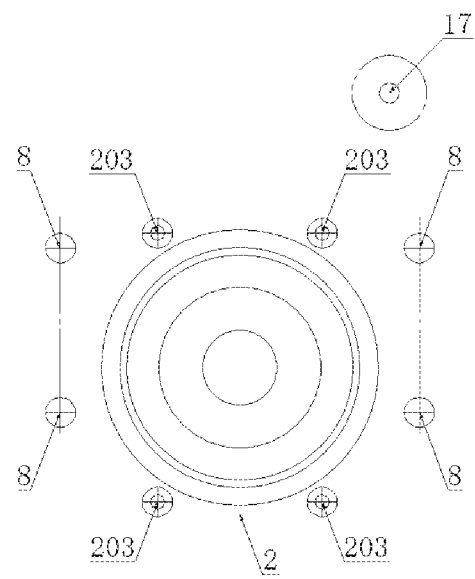
Figure 11:
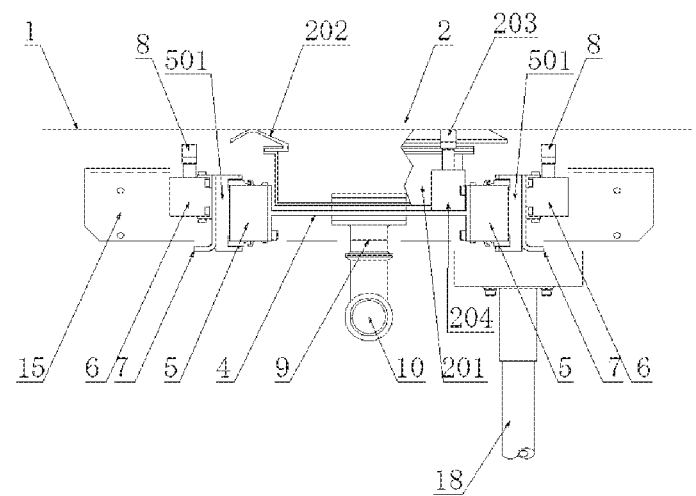
Figure 12:
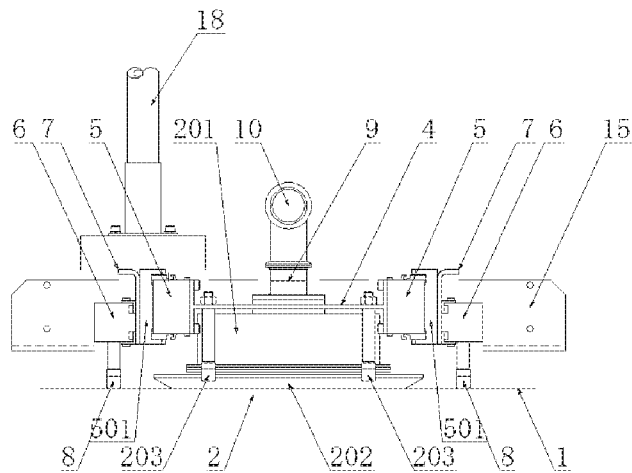
FIG. 12(a) illustrates FIG. 4 of Japanese Patent Application No. 2014-247953.
FIG. 12(b) illustrates FIG. 5 of Japanese Patent Application No. 2014-247953.
FIG. 12(c) illustrates FIG. 6 of Japanese Patent Application No. 2014-247953.
Figure 12:
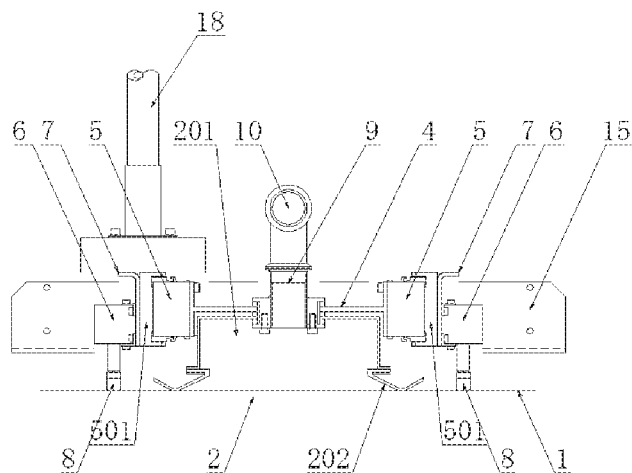
Figure 12:
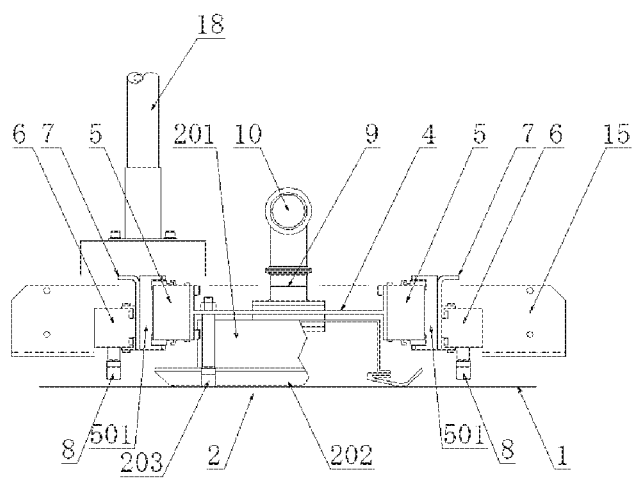
Figure 13:
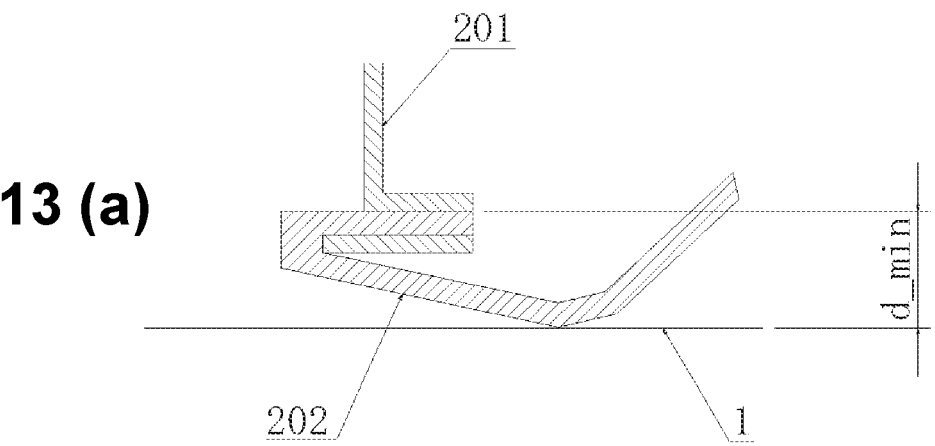
FIG. 13(a) shows that the shape of the negative pressure suction unit seal 202 is in the maximum contraction state.
FIG. 13(b) shows that the shape of the negative pressure suction unit seal 202 is in a standard state.
FIG. 13(c) shows that the shape of the negative pressure suction unit seal 202 is in the maximum extension state.
Figure 13:
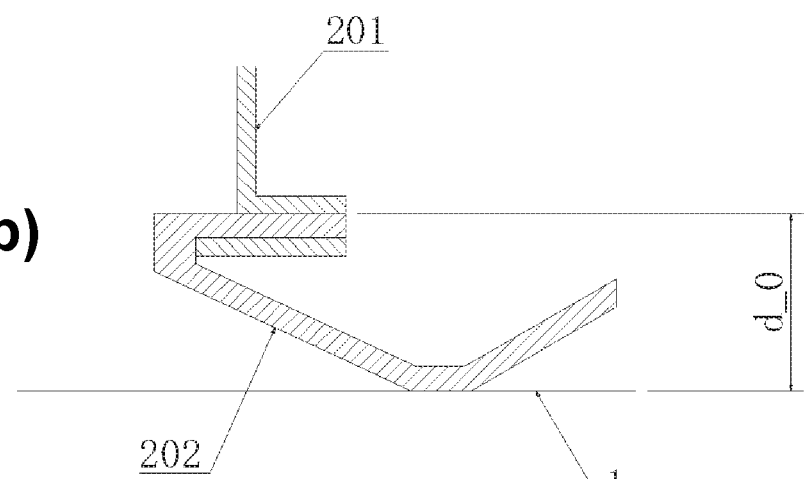
Figure 13:
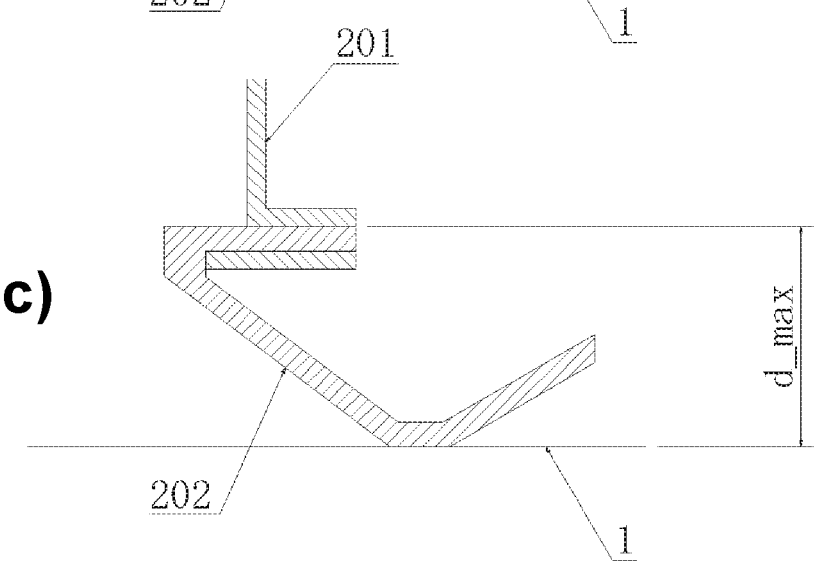

In the meantime, FIG. 11 shows a state of the device immediately before the first step.

In FIGS. 7 to 11, the entire device travels downward.

A large arrow shows the moving direction and the moving distance of each member in the corresponding steps.

A double circle shows the double-acting leg members 8 or the fixing legs 203 strongly pressed against the object surface 1.

Figure 7:
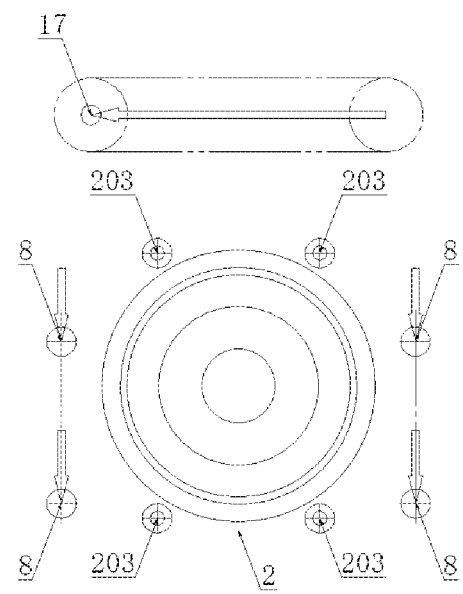
FIG. 7 is a rear view, a bottom view and a partial cross-sectional view of the device shown in FIG. 1 showing the action of the device in the first step in the drawing showing the steps in which a working device or an inspection device scans the object surface and the entire device travels along the object surface.
Figure 7:
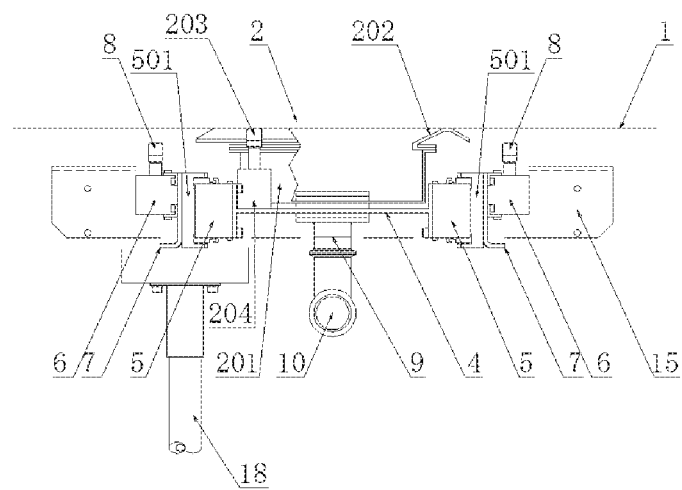

First, in the first step shown in FIG. 7, the polishing and cleaning material blast nozzle 17 moves from right to left.

At the same time, the double-acting leg members 8 are moved in the traveling direction of the entire device, while maintaining the state of separation from the object surface 1, by driving of the Y-axis reciprocation units 5.

A circle drawn by alternate long and two short dashed lines and surrounding the polishing and cleaning material blast nozzle 17 shows the area of the object surface 1 where the polishing and cleaning material is jetted.

Movement of the polishing and cleaning material blast nozzle 17 from right left is referred to as outward movement of the polishing and cleaning material blast nozzle 17.

In the meantime, in the first step shown in FIG. 7, the negative pressure adhering unit fixing legs 203 are strongly pressed against the object surface 1, while the double-acting leg members 8 are separated from the object surface 1.

Figure 8:
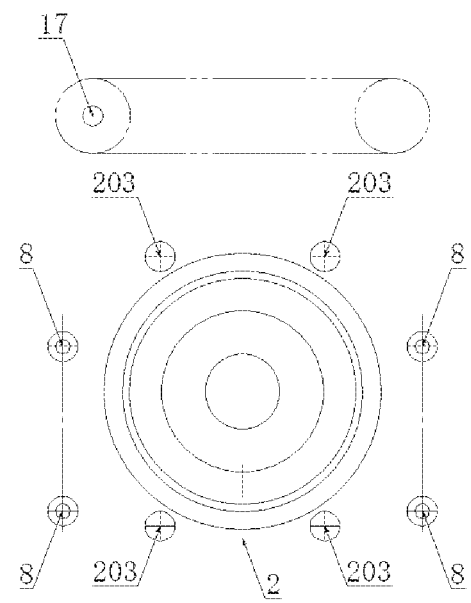
FIG. 8 is a rear view, a bottom view and a partial cross-sectional view showing action of the device in the second step.
Figure 8:
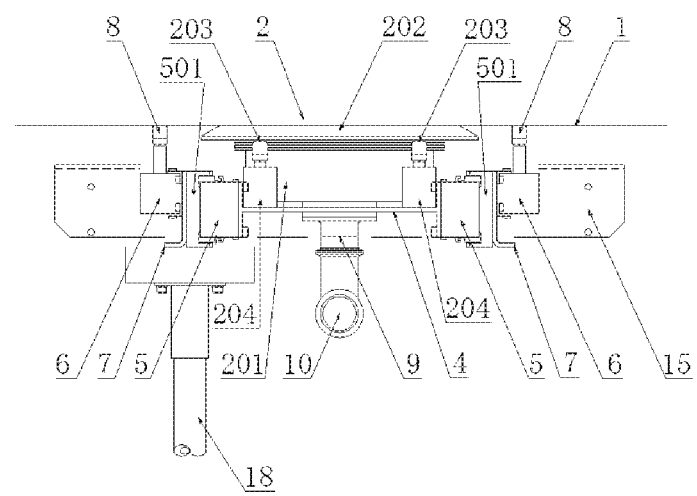

In the second step shown in FIG. 8, the negative pressure adhering unit fixing legs 203 are separated from the object surface 1, while the double-acting leg members 8 are strongly pressed against the object surface 1.

Figure 9:
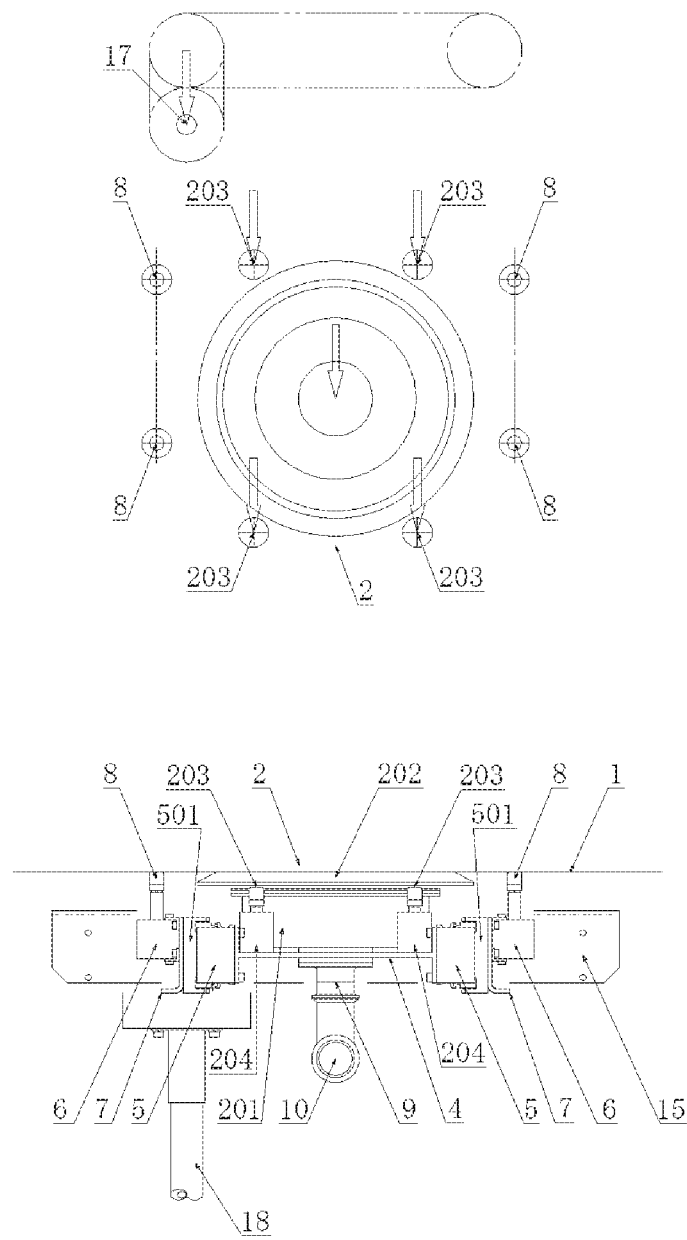
FIG. 9 is a rear view, a bottom view and a partial cross-sectional view showing action of the device in the third step.

In the third step shown in FIG. 9, the negative pressure adhering unit provided with the fixing legs 203 moves downward along the object surface 1 while maintaining the state of adhering to the object surface 1, and the polishing and cleaning material blast nozzle 17 also moves downward simultaneously.

In the meantime, in the third step shown in FIG. 9, the negative pressure adhering unit fixing legs 203 are separated from the object surface 1, while the double-acting leg members 8 are strongly pressed against the object surface 1.

Figure 10:
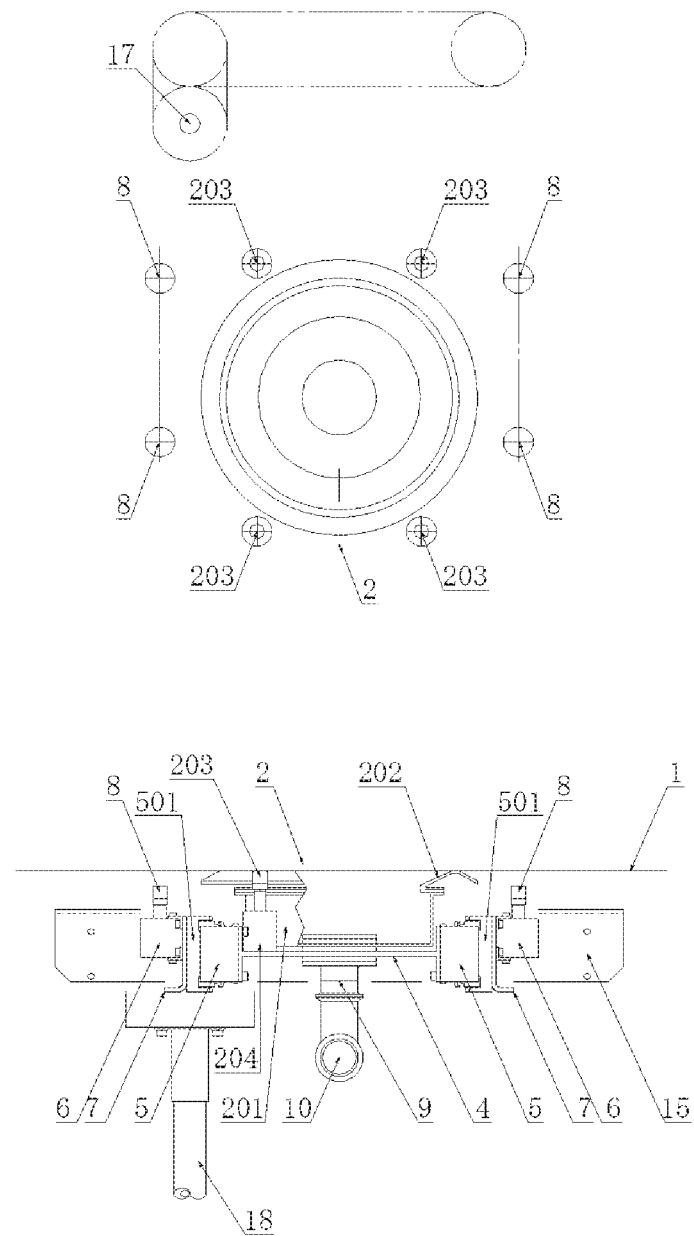
FIG. 10 is a rear view, a bottom view and a partial cross-sectional view showing action of the device in the fourth step.

In the fourth step shown in FIG. 10, the negative pressure adhering unit fixing legs 203 are strongly pressed against the object surface 1, while the double-acting leg members 8 are separated from the object surface 1.

When the fourth step is completed, the above-mentioned first to fourth steps are repeated except for the working direction of the polishing and cleaning material blast nozzle 17.

In the meantime, as for the working direction of the polishing and cleaning material blast nozzle 17, in the first step, the first step of outward movement of the polishing and cleaning material blast nozzle 17 from right to left and the first step of homeward movement of the same from left to right are alternately repeated.

In the device shown in FIGS. 1 to 11, when the Y-axis reciprocation unit 5 and the Z-axis reciprocation unit 6 on the left side are allowed to travel and move downward, and the Y-axis reciprocation unit 5 and the Z-axis reciprocation units 6 on the right side are allowed to travel and move upward, for example, the entire device rotationally travels counter-clockwise around the rotary coupling means 9, serving as a central axis, and along the object surface 1.

Upon the rotational traveling, the negative pressure adhering unit 2 does not rotate along the object surface 1 due to the action of the rotary coupling means 9.

Namely, friction force is generated between the negative pressure adhering unit seal 202 and the object surface 1, however, the friction force between the negative pressure adhering unit seal 202 and the object surface 1 does not hinder rotational traveling of the entire device upon the above-mentioned rotational traveling, which is very favorable for achieving rotational traveling with high positioning accuracy.

The above-mentioned device of the preferred embodiment of the first invention related to this invention brings about the following effects.

Namely, in the "device capable of adhering by suction to an object surface and traveling therealong" by using negative pressure as described in claims 1 to 3, since an expensive displacement sensor like a servo motor or a rotary encoder, and an electric control system are not needed, and the configuration and control are simplified, the manufacturing cost can be reduced.

In addition, failures are reduced and the maintenance is facilitated as the configuration and control are simplified.

Further, heavy parts like wheels with a rotary shaft and a bearing, the servo motor with a reduction gear, a transmission mechanism transmitting the rotational driving force of the motor to the wheels, etc., are not needed. Thus, since the configuration is simple and the whole device is lightweight, the device is easily used and become more convenient.

Furthermore, since positional accuracy during intermittent traveling is improved, work quality can be improved when jetting a surface treatment material, etc., or inspection, etc., of the object surface.

Preferred embodiments of the device of the first invention related to this invention are explained hereinbefore, however, various embodiments of the device of this invention other than the above-mentioned preferred embodiments can be conceived according to the scope of the claims of the invention.

In the meantime, the preferred embodiments of the device of this invention have been explained on the premise that the device of this invention exists on the object surface in the atmosphere. However, the device of this invention can also be applied even in water. As for the negative pressure generating means in this case, a water pump or a water-driven ejector can be used instead of a vacuum pump.

In order to solve the above-mentioned problem, according to the second invention related to this invention, the "device capable of adhering to an object surface and traveling therealong" as described in claim 4, for example, is provided.

A device capable of adhering to an object surface and traveling therealong comprising:

where axes parallel to the object surface and perpendicular to each other are referred to as X-axis and Y-axis, and an axis perpendicular to the object surface is referred to as Z-axis;

an adhering unit adhering to the object surface by the action of negative pressure;

Y-axis reciprocation units respectively arranged on right and left sides of the adhering unit with respect to the moving direction thereof, and capable of reciprocating optionally in a front-back direction of the moving direction, that is, in the Y-axis direction;

Z-axis reciprocation units mounted on each of the Y-axis reciprocation units and capable of reciprocating optionally in the direction intersecting with the object surface, that is, in the Z-axis direction;

double-acting leg members respectively mounted on the Z-axis reciprocation units, and capable of reciprocating optionally in the direction intersecting with the object surface, that is, in the Z-axis direction;

second Z-axis reciprocation units mounted on the adhering unit and capable of reciprocating optionally in the Z-axis direction;

second double-acting leg members respectively mounted on the second Z-axis reciprocation units, and capable of reciprocating optionally in the Z-axis direction;

and X-axis reciprocation units connecting the left Y-axis reciprocation unit to the right Y-axis reciprocation unit, and the reciprocating members of the Y-axis reciprocation units respectively mounted on the adhering unit, and capable of reciprocating the adhering unit optionally in the X-axis direction;

wherein, when the device travels in the Y-axis direction along the object surface adhering to the object surface;

as a first step; while maintaining the default state that the double-acting leg members are separated from the object surface by the action of the Z-axis reciprocation units, the second double-acting leg members are strongly pressed against the object surface by the action of the second Z-axis reciprocation units; the double-acting leg members is moved in the traveling direction of the device by driving the Y-axis reciprocation units;

as a second step, the double-acting leg members are strongly pressed against the object surface by the action of the Z-axis reciprocation units, and the second double-acting leg members are separated from the object surface by the action of the second Z-axis reciprocation units;

as a third step, the adhering unit adhering to the object surface is moved in the traveling direction of the device by driving the Y-axis reciprocation units while maintaining the state that the double-acting leg members are strongly pressed against the object surface and the second double-acting leg members are separated from the object surface;

as a fourth step, the double-acting leg members are separated from the object surface by the action of the Z-axis reciprocation units and the second double-acting leg members are strongly pressed against the object surface by the action of the second Z-axis reciprocation units, thus it is returned to the state immediately before the first step, that is, it is returned to the default state;

and the operations of the first to fourth steps are repeated thereafter, by which the device adhering to the object surface travels intermittently therealong;

wherein, when the device travels in the X-axis direction along the object surface adhering to the object surface;

as a first step; while maintaining the default state that the double-acting leg members are separated from the object surface by the action of the Z-axis reciprocation units, the second double-acting leg members are strongly pressed against the object surface by the action of the second Z-axis reciprocation units; the double-acting leg members is moved in the traveling direction of the device by driving the X-axis reciprocation units;

as a second step, the double-acting leg members are strongly pressed against the object surface by the action of the Z-axis reciprocation units, and the second double-acting leg members are separated from the object surface by the action of the second Z-axis reciprocation units;

as a third step, the adhering unit adhering to the object surface is moved in the traveling direction of the device by driving the X-axis reciprocation units while maintaining the state that the double-acting leg members are strongly pressed against the object surface and the second double-acting leg members are separated from the object surface;

as a fourth step, the double-acting leg members are separated from the object surface by the action of the Z-axis reciprocation units and the second double-acting leg members are strongly pressed against the object surface by the action of the second Z-axis reciprocation units, thus it is returned to the state immediately before the first step, that is, it is returned to the default state;

and the operations of the first to fourth steps are repeated thereafter, by which the device adhering to the object surface travels intermittently therealong.

Note that the definition of the "default state" in the present invention is as follows.

When the state of the device changes to a plurality of states and the mode of the change is repeated, the state arbitrarily selected from the plurality of states is referred to as "default state".

The second invention related to this invention brings about the following effects.

Namely, in the "device capable of adhering to the object surface and traveling therealong" by using negative pressure as described in claims 4 to 6, since an expensive displacement sensor like a servo motor or a rotary encoder, and an electric control system are not needed and the configuration and control are simplified, the manufacturing cost can be reduced. In addition, failures are reduced and the maintenance is facilitated as the configuration and control are simplified.

Further, heavy parts like wheels with a rotary shaft and a bearing, the servo motor with a reduction gear, a transmission mechanism transmitting the rotational driving force of the motor to the wheels, etc., are not needed. Thus, since the configuration is simple and the whole device is lightweight, the device is easily used and become more convenient.

Furthermore, since positional accuracy during intermittent traveling is improved, work quality can be improved when jetting a surface treatment material, etc., or inspection, etc. of the object surface.

In the present application, in addition to the effects of the above invention described in Japanese Patent Application No. 2014-247953, the following effects are further added.

That is, if the level of the surface of the second double-acting leg member 203 that contacts the object surface and the level of the surface of the double-acting leg member 8 that contacts the object surface are basically set to the same level of the surface, in addition, if the surface of the second double-acting leg member 203 is retracted to a position away from the object surface while traveling on the object surface of the negative pressure adhering and traveling device, there is no risk that the seal 202 will deviate from the maximum contracted state due to that the second double-moving leg member 203 contacts the convex portion of the object surface and hinders the traveling function of the device.

Preferred embodiments of the device configured according to the second invention related to this invention are explained in more detail hereinafter referring to the accompanying drawings.

Figure 14:
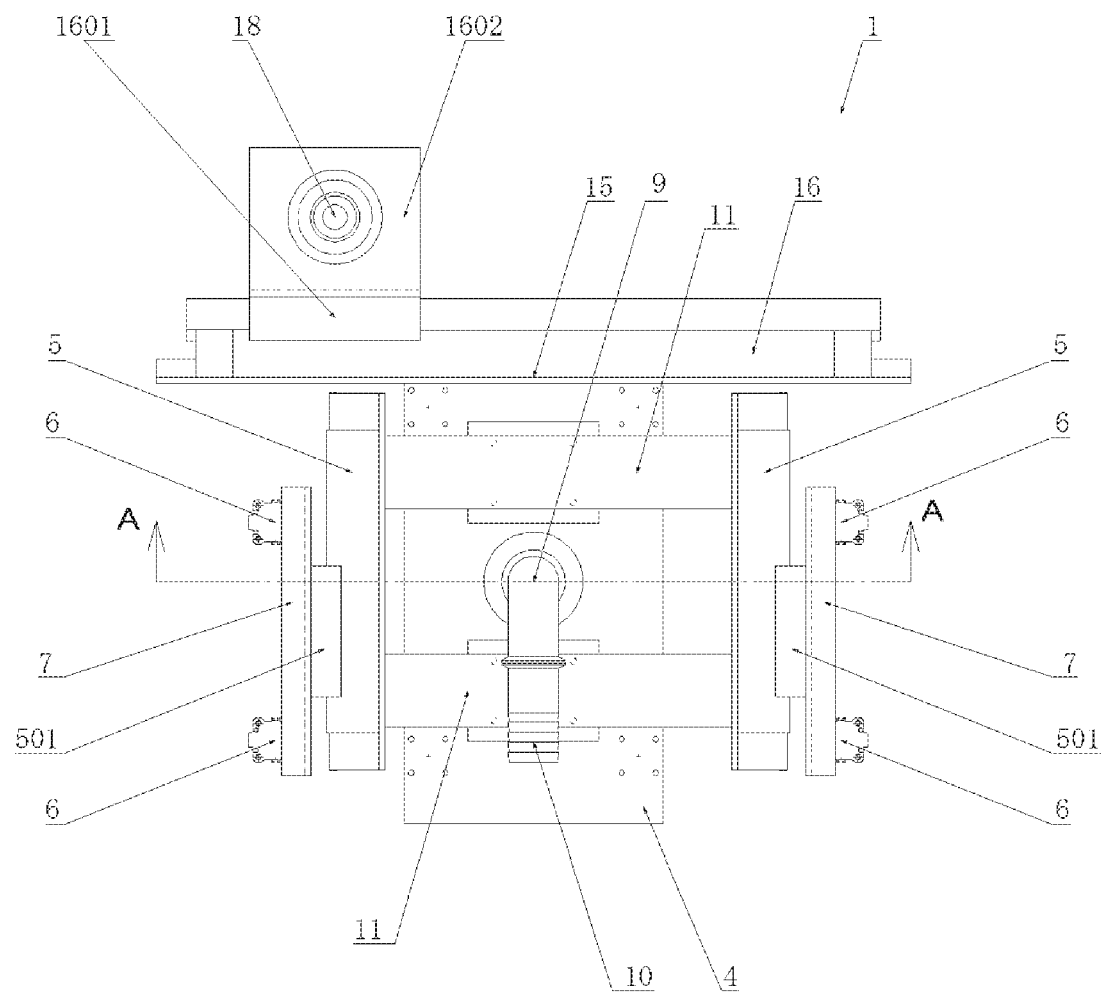
FIG. 14 is a front view showing the first preferred embodiment of the device configured according to the third invention related to this invention.
Figure 15:
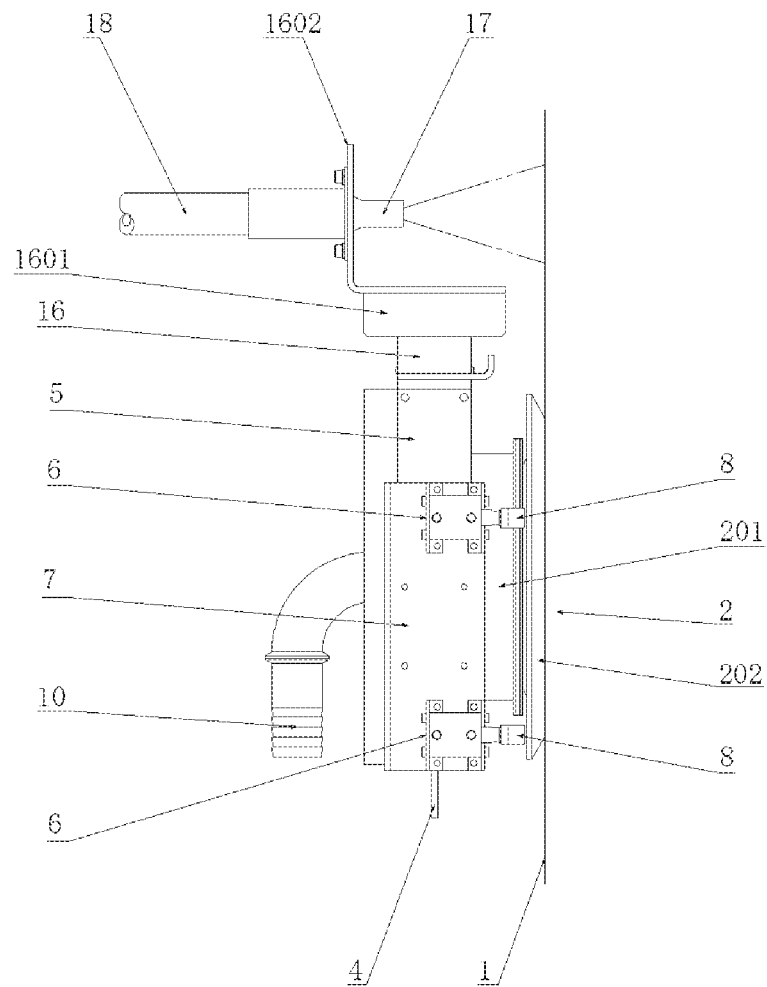
FIG. 15 is a right-side view of the device shown in FIG. 14.
Figure 16:
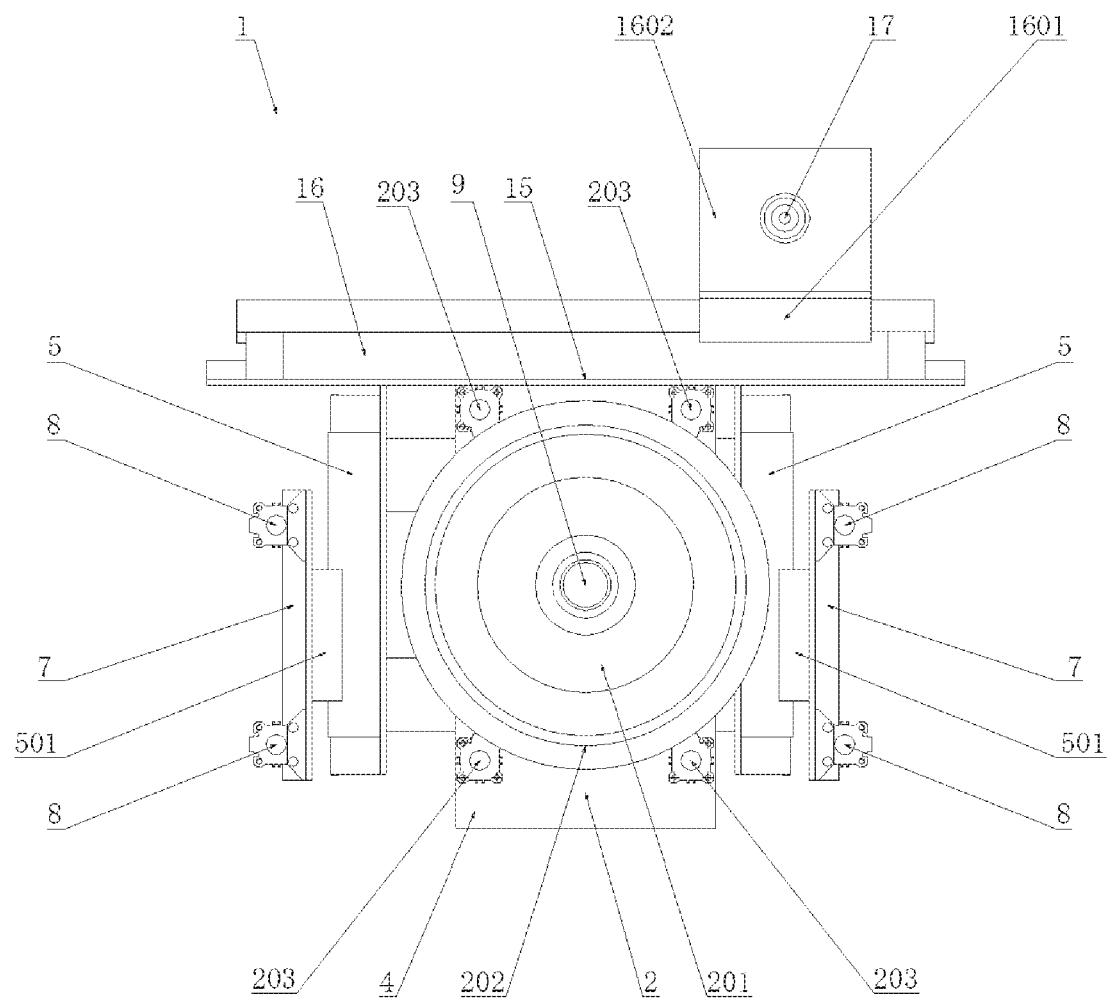
FIG. 16 is a rear view of the device shown in FIG. 14 and seen from the direction of the object surface.
Figure 17:
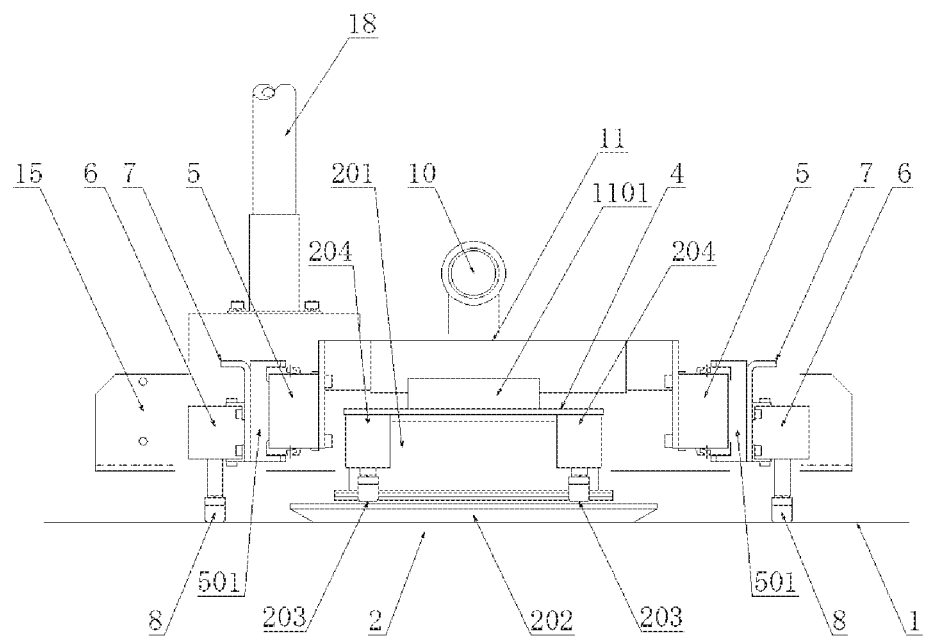
FIG. 17 is a bottom view of the device shown in FIG. 14.
Figure 18:
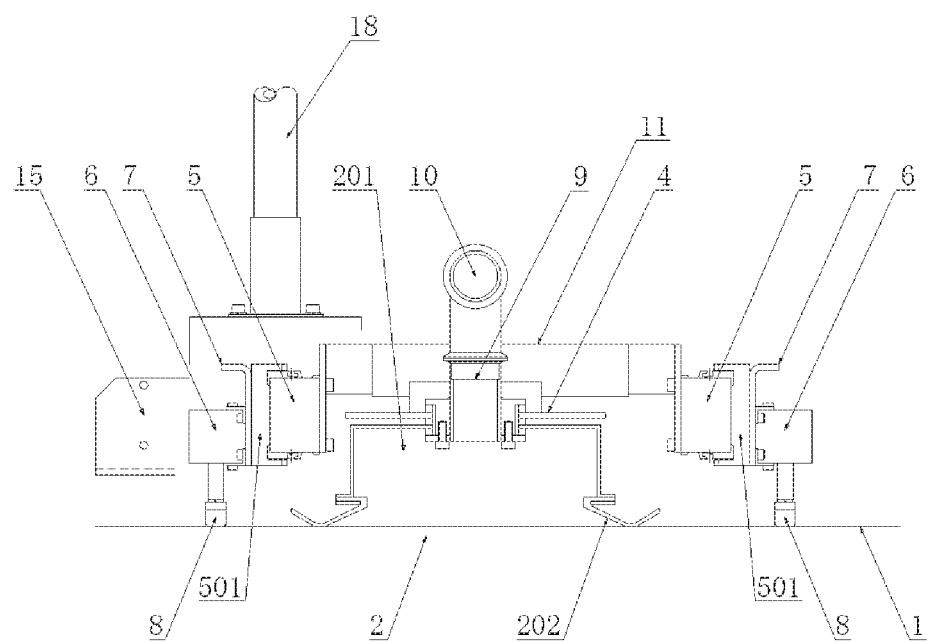
FIG. 18 is a cross-sectional view of the device shown in FIG. 14 taken along the line A-A.
Figure 19:
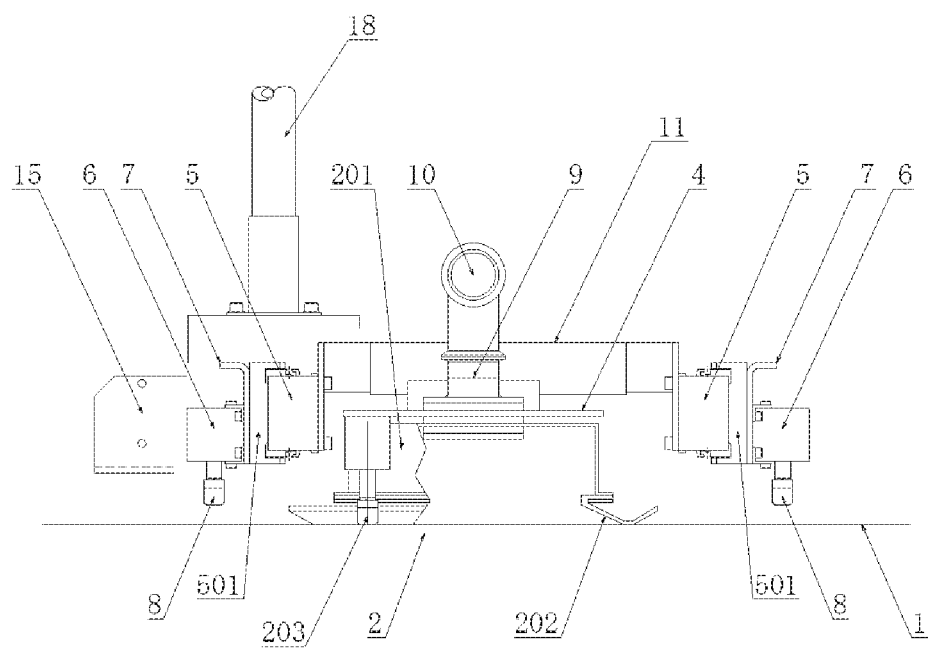
FIG. 19 is a bottom view and a partial cross-sectional view of the device shown in FIG. 14 taken along the line A-A showing the state in which double-acting leg members of a Z-axis reciprocation unit are separated from the object surface.

FIG. 14 is a front view of the device of the preferred embodiment and the object surface 1 seen from the direction away from the object surface 1 to show the state in which the device of the preferred embodiment adheres to an object surface 1, being a wall surface, by negative pressure.

In FIG. 14, the device of the preferred embodiment (referred to as the "entire device" hereinafter) travels upward and downward, and rotates clockwise or counter-clockwise along the object surface 1.

When referring to the parts comprising the entire device, a left-side part is referred to as "left" and the right-side part is referred to as "right".

In FIG. 14, the axis in the up-down direction is referred to as a Y-axis, and the axis in the left-right direction is referred to as an X-axis.

The axes parallel to the object surface and orthogonal to each other are referred to as X-axis and Y-axis, and the axis orthogonal to the object surface is referred to as Z-axis.

The entire device will be explained hereinafter with reference to FIGS. 14 to 19.

The device shown in the FIGS. is provided with a main frame 4. The main frame 4 is formed into a plate shape in FIG. 14. A motion member 1101 of an X-axis reciprocating unit 11 composed of a rodless cylinder is mounted on each of the upper and lower parts of the main frame 4.

At the left end of the upper X-axis reciprocating unit 11 and at the left end of the lower X-axis reciprocating unit 11, a Y-axis reciprocating unit 5 composed of a rodless cylinder is mounted.

At the right end of the upper X-axis reciprocating unit 11 and at the right end of the lower X-axis reciprocating unit 11, a Y-axis reciprocating unit 5 composed of another rodless cylinder is mounted.

The Z-axis reciprocation unit frames 7 are mounted on the motion members 501 of the Y-axis reciprocation units 5.

Two Z-axis reciprocation units 6 comprising reciprocation cylinders are mounted on the Z-axis reciprocation unit frames 7.

Double-acting leg members 8 mainly made from polyurethane are mounted on front ends of piston rods of the Z-axis reciprocation units 6.

A negative pressure adhering unit 2 is mounted on a center part of the main frame 4 by the intermediary of a hollow rotary coupling means 9 in a rotatable manner along the object surface 1.

The negative pressure adhering unit 2 comprises a negative pressure adhering unit casing 201 having a cylindrical shape opening to the object surface 1, a negative pressure adhering unit seal 202 formed into a ring-like shape using polyurethane as its material and flared toward the object surface 1 like a trumpet, second Z-axis reciprocating unit 204, and A second double-acting leg member 203 mainly made of polyurethane, which is attached to the tip of the piston rod of the second Z-axis reciprocating unit 204.

The second double-acting leg member 203 is a member for maintaining a minimum gap between the object surface 1 and the end of the negative pressure suction unit casing 201 at a fixed distance.

When the negative pressure suction unit 2 moves along the object surface 1, the piston rod of the second Z-axis reciprocating unit 204 contracts, so that the second double-acting leg member 203 separates from the object surface 1.

Further, when the negative pressure suction unit 2 does not move along the object surface 1, the piston rod of the second Z-axis reciprocating unit 204 extends, so that the second double-acting leg member 203 is pressed against the object surface 1.

A suction hose joint 10 is fitted to the hollow rotary coupling means 9.

A negative pressure generating means (not shown) like a vacuum pump is connected to the suction hose joint 10 by the intermediary of a suction hose (not shown).

A work frame 15 is welded to an upper end of the main frame 4.

A second X-axis reciprocation unit 16 comprising the rodless cylinder is mounted on the work frame 15.

A polishing and cleaning material blast nozzle 17 is mounted on a motion member 1601 of the second X-axis reciprocation unit 16 by the intermediary of a nozzle mounting member 1602.

A polishing and cleaning material pressure-feeding device (not shown) is connected to the polishing and cleaning material blast nozzle 17 by the intermediary of a polishing and cleaning material pressure-feeding blast hose 18.

A working device like a coating gun or a thermal spraying gun working on the object surface, or a sensor obtaining information from the object surface like an ultrasonic flaw detector can be mounted on the motion member 1601 of the second X-axis reciprocation unit 16 instead of the polishing and cleaning material blast nozzle 17.

Operation and effects of the above-mentioned device will be explained hereinafter.

When the negative pressure generating means (not shown) is energized, the atmosphere-like fluid in the negative pressure adhering unit 2 is discharged to the outside through the suction hose joint 10 and the suction hose (not shown), and the inside of the negative pressure adhering unit 2 is decompressed as required.

When the inside of the negative pressure adhering unit 2 is decompressed, the entire device adheres to the object surface 1 by the pressure of the surrounding fluid like the atmosphere acting on the negative pressure adhering unit 2 due to the difference in fluid pressure between the inside and the outside of the negative pressure adhering unit 2.

When the pressure inside the negative pressure adhering unit 2 is maintained at a required pressure, the negative pressure adhering unit seal 202 is brought into tight contact to the object surface 1 due to the difference in pressure between the inside and the outside of the negative pressure adhering unit 2. Accordingly, the fluid outside the negative pressure adhering unit 2 is prevented from flowing inside to the utmost.

Mixed fluid of the polishing and cleaning material and the compressed air, or mixed fluid of the polishing and cleaning material and high-pressure water is jetted powerfully from the polishing and cleaning material blast nozzle 17 to the object surface 1 so that rust, degraded paint or the like adhering to the object surface 1 can be removed.

By the action of the second X-axis reciprocating unit 16, the blast nozzle 17 for blasting abrasive material reciprocates in the X-axis direction intersecting the Y-axis which is the running direction of the entire device.

Steps for scanning the object surface 1 by the polishing and cleaning material blast nozzle 17 and traveling of the entire device along the object surface 1 will be explained below with reference to FIGS. 20 to 24.

Figure 24:
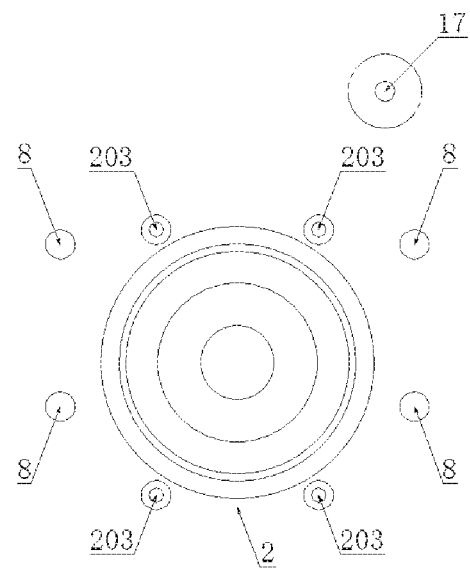
FIG. 24 is a rear view, a bottom view and a partial cross-sectional view showing the state of the device immediately before the first step in the drawing showing the steps in which the working device or the inspection device scans the object surface and the entire device travels along the object surface in the Y-axis direction, in the device shown in FIG. 14.
Figure 24:
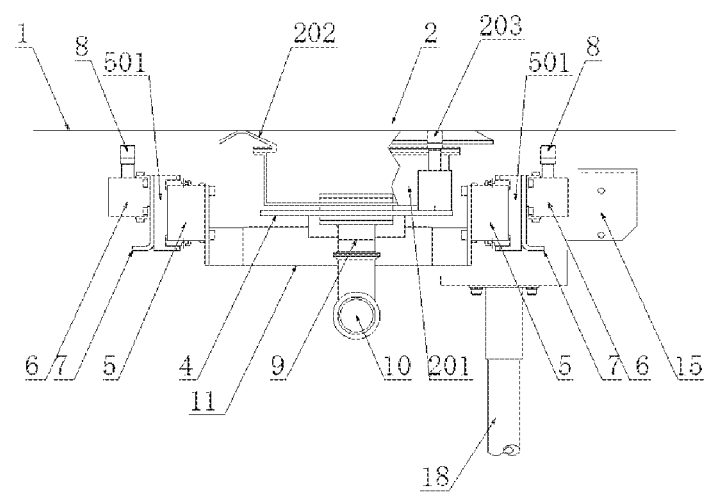
Figure 25:
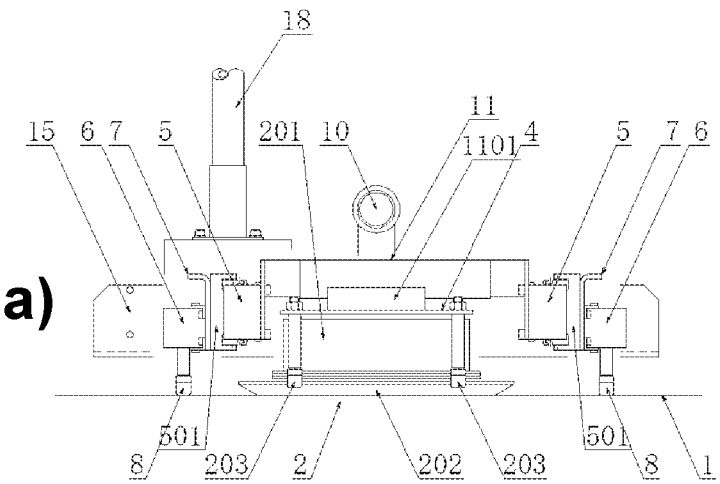
FIG. 25(a) illustrates FIG. 17 of Japanese Patent Application No. 2014-247953.
FIG. 25(b) illustrates FIG. 18 of Japanese Patent Application No. 2014-247953.
FIG. 25(c) illustrates FIG. 19 of Japanese Patent Application No. 2014-247953.
Figure 25:
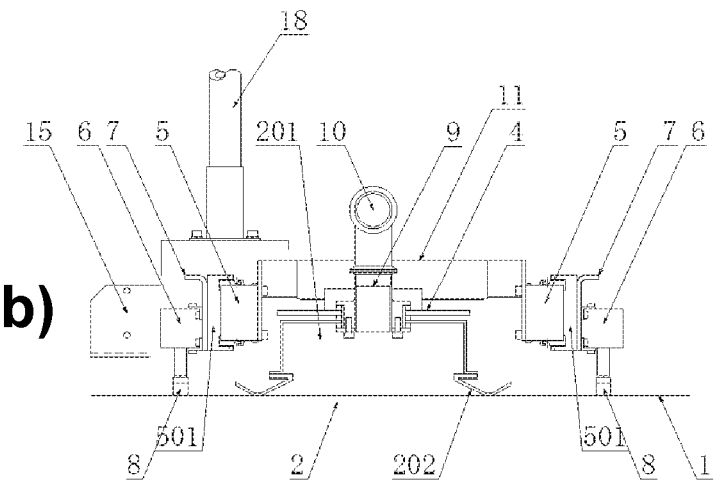
Figure 25:
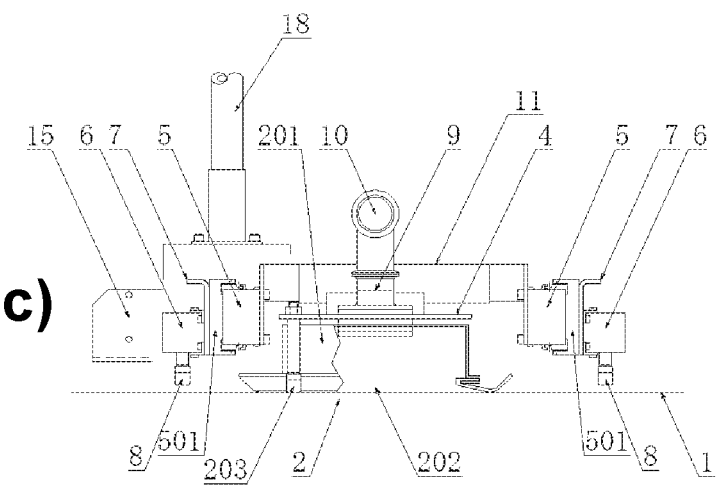
Figure 26:
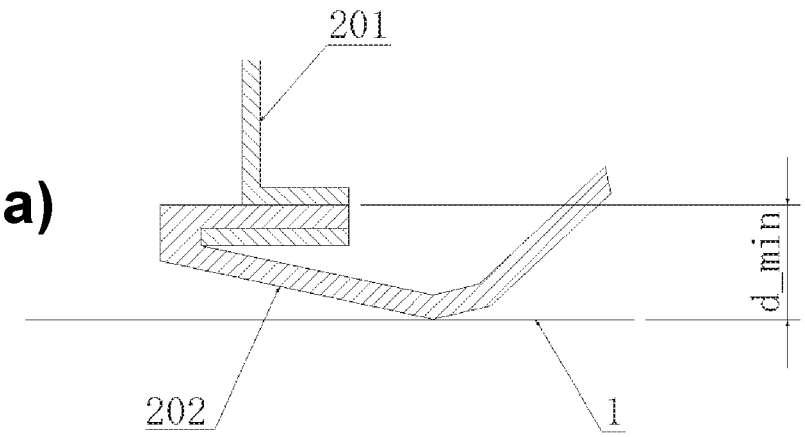
FIG. 26(a) shows that the shape of the negative pressure suction unit seal 202 is in the maximum contraction state.
FIG. 26(b) shows that the shape of the negative pressure suction unit seal 202 is in a standard state.
FIG. 26(c) shows that the shape of the negative pressure suction unit seal 202 is in the maximum extension state.
Figure 26:
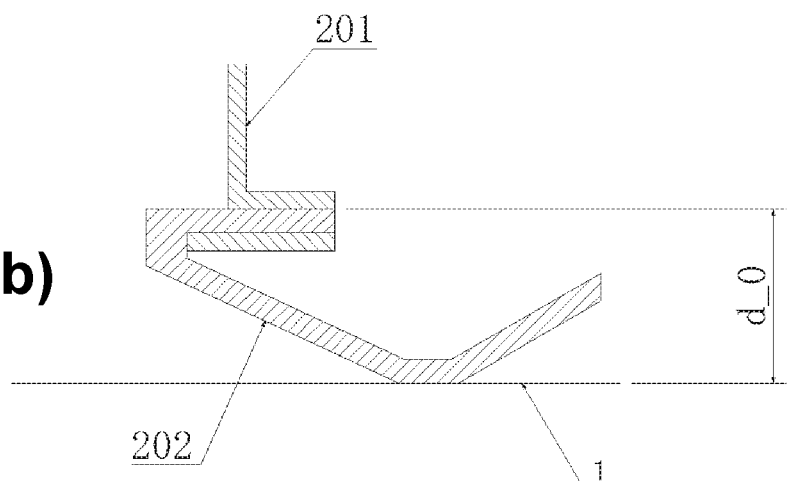
Figure 26:
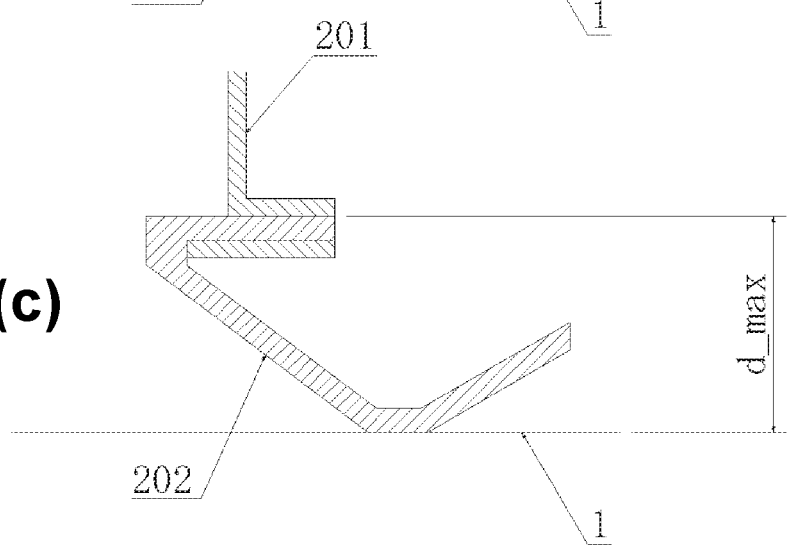

In the meantime, FIG. 24 shows a state of the device immediately before the first step.

In FIGS. 20 to 24, the entire device travels downward.

A large arrow shows the moving direction and the moving distance of each member in the corresponding steps.

A double circle shows the double-acting leg members 8 or the second double acting leg member 203 strongly pressed against the object surface 1.

Figure 20:
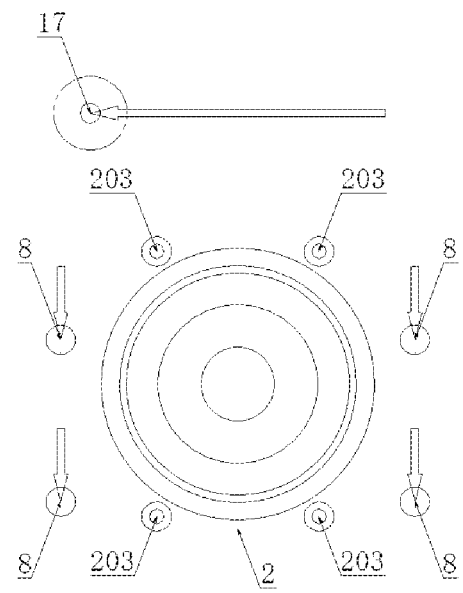
FIG. 20 is a rear view, a bottom view and a partial cross-sectional view showing the action of the device in the first step of the drawings showing the steps in which the working device or the inspection device scans the object surface and the entire device travels along the object surface in a Y-axis direction, in the device shown in FIG. 14.
Figure 20:
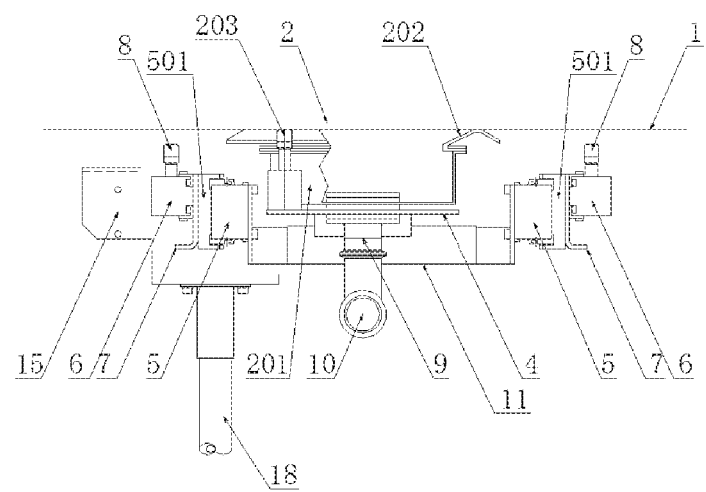

First, in the first step shown in FIG. 20, the polishing and cleaning material blast nozzle 17 moves from right to left.

At the same time, the double-acting leg members 8 are moved in the traveling direction of the entire device, while maintaining the state of separation from the object surface 1, by driving the Y-axis reciprocation units 5.

A circle drawn by alternate long and two short dashed lines and surrounding the polishing and cleaning material blast nozzle 17 shows the area of the object surface 1 where the polishing and cleaning material is jetted.

Movement of the polishing and cleaning material blast nozzle 17 from right left is referred to as outward movement of the polishing and cleaning material blast nozzle 17.

In the meantime, in the first step shown in FIG. 20, the second double-acting leg members 203 are strongly pressed against the object surface 1, while the double-acting leg members 8 are separated from the object surface 1.

Figure 21:
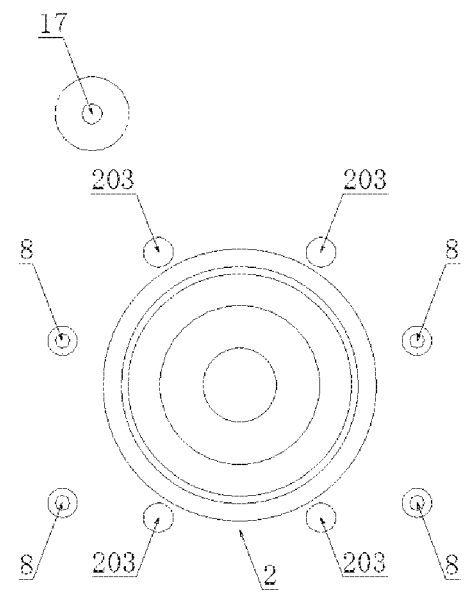
FIG. 21 is a rear view, a bottom view and a partial cross-sectional view showing the action of the device in the second step.
Figure 21:
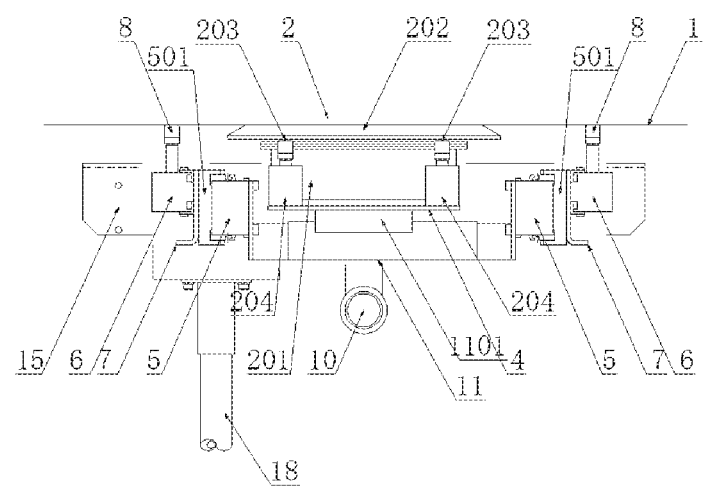

In the second step shown in FIG. 21, the second double-acting leg members 203 are separated from the object surface 1, while the double-acting leg members 8 are strongly pressed against the object surface 1.

Figure 22:
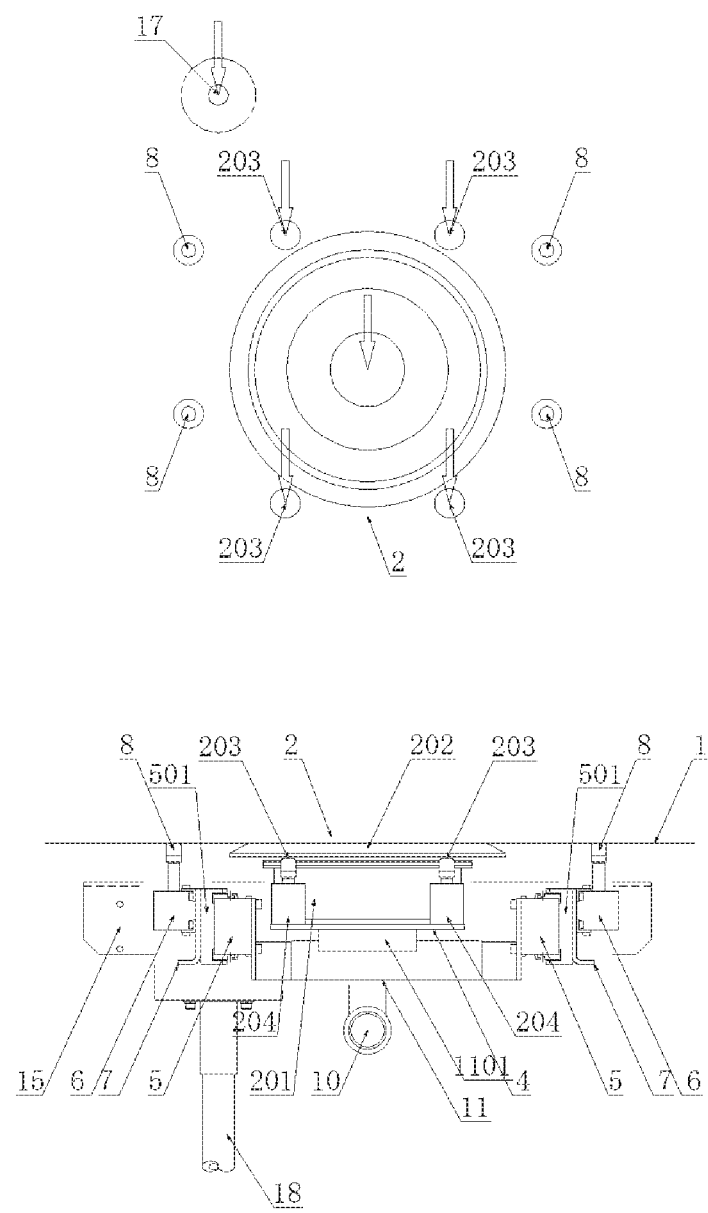
FIG. 22 is a rear view, a bottom view and a partial cross-sectional view showing the action of the device in the third step.

In the third step shown in FIG. 22, the negative pressure adhering unit provided with the second double-acting leg members 203 moves downward along the object surface 1 while maintaining the state of adhering to the object surface 1, and the polishing and cleaning material blast nozzle 17 also moves downward at the same time.

In the meantime, in the third step shown in FIG. 22, the second double-acting leg members 203 are separated from the object surface 1, while the double-acting leg members 8 are strongly pressed against the object surface 1.

Figure 23:
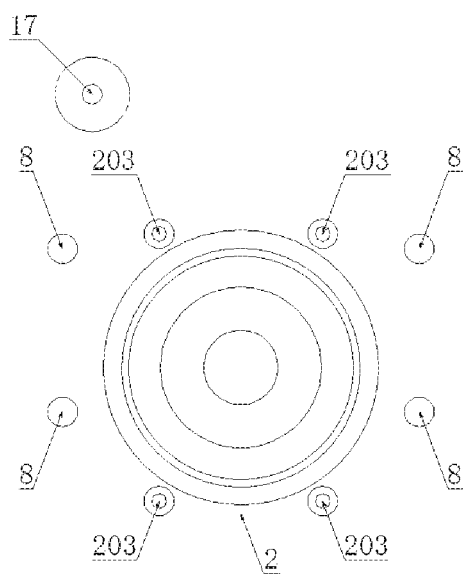
FIG. 23 is a rear view, a bottom view and a partial cross-sectional view showing the action of the device in the fourth step.
Figure 23:
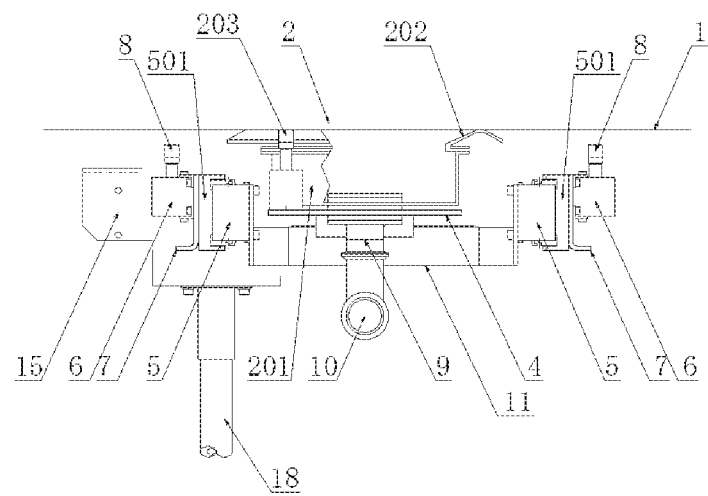

In the fourth step shown in FIG. 23, the second double-acting leg members 203 are strongly pressed against the object surface 1, while the double-acting leg members 8 are separated from the object surface 1.

When the fourth step is completed, the above-mentioned first to fourth steps are repeated except for the working direction of the polishing and cleaning material blast nozzle 17.

As for the working direction of the polishing and cleaning material blast nozzle 17, in the first procedure, the first procedure in which the polishing and cleaning material blast nozzle 17 moves forward from right to left and the first procedure in which the blast nozzle 17 moves multiple paths from left to right are alternately repeated.

With reference to FIGS. 27 to 31, a procedure in which the entire device travels in the X-axis direction along the object surface 1 will be described below.

Figure 27:
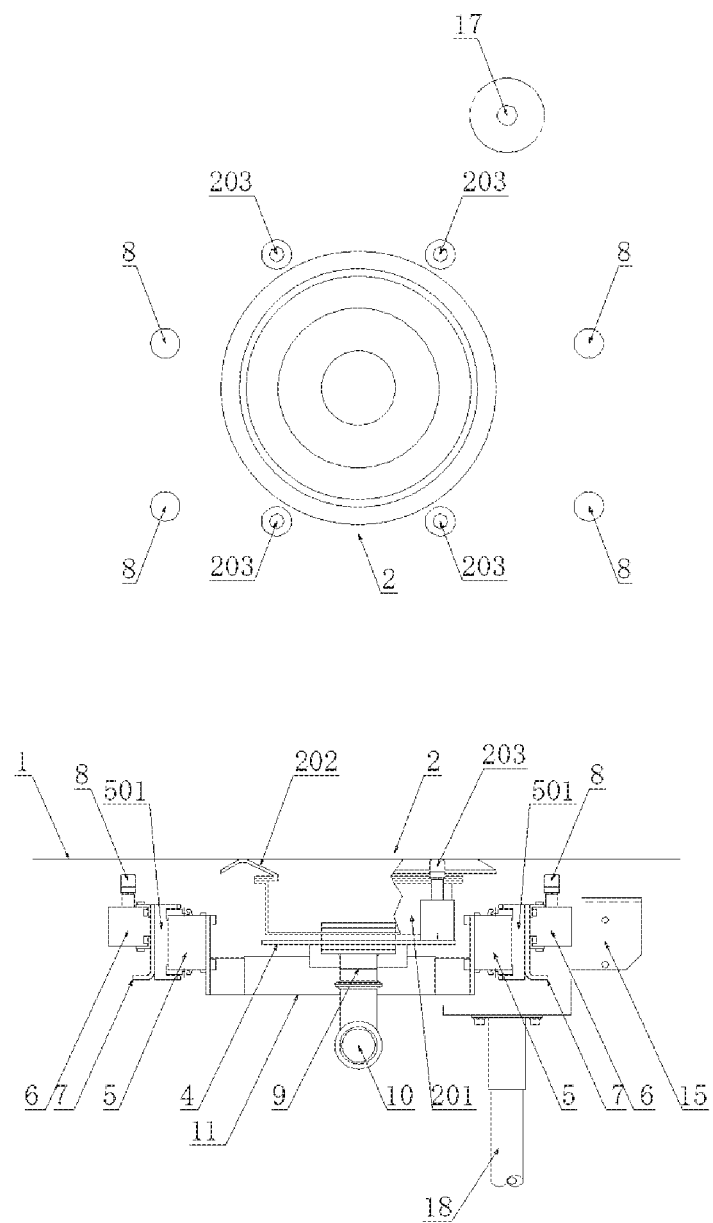
FIG. 27 is a rear view, a bottom view and a partial cross-sectional view showing the state of the device immediately before the first step, in the drawing showing the steps in which the entire device travels along the object surface in the X-axis direction, in the device shown in FIG. 14.

FIG. 27 is a drawing showing the state of the apparatus immediately before the first procedure.

In FIGS. 27 to 31, the direction in which the entire apparatus travels is from right to left.

Large arrows indicate the moving direction and moving distance of each member in the procedure.

Double circles indicate the double-acting leg member 8 or the second double-acting leg member 203 that is strongly pressed against the object surface 1.

FIGS. 21 and 22 show that the second double-acting leg member 203 is separated from the object surface 1 because the double-acting leg member 8 is strongly pressed against the object surface 1. However, this does not necessarily mean that the second double-acting leg member 203 must be separated from the object surface 1.

That is, the frictional force between the second double-acting leg member 203 and the object surface 1 is reduced because the double-acting leg member 8 is strongly pressed against the object surface 1. Thus, the object of the present invention is achieved if the negative pressure adhering and traveling device having the second double-acting leg member 203 can travel along the object surface 1 while adhering to the object surface 1.

Figure 28:
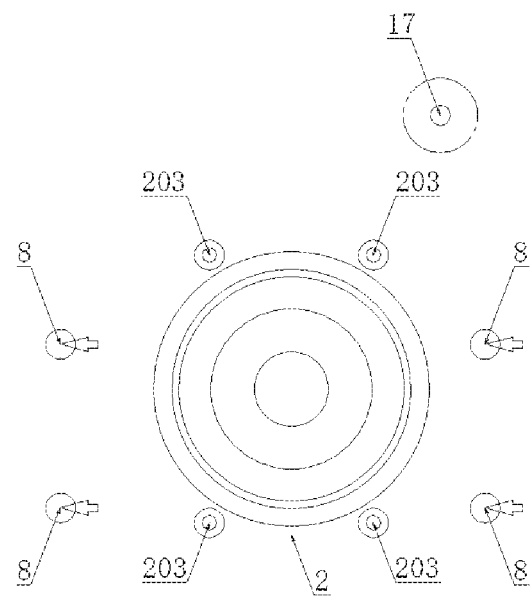
FIG. 28 is a rear view, a bottom view and a partial cross-sectional view showing the steps in which the entire device travels along the object surface in the Y-axis direction, in the device shown in FIG. 14.
Figure 28:
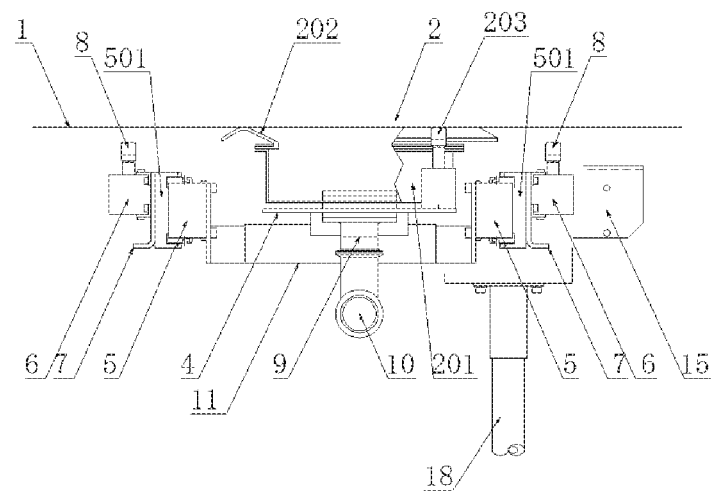

First, in the first procedure shown in FIG. 28, the double-acting leg member 8 is driven by driving the X-axis reciprocating unit 11 and the double-acting leg member 8 move from right to left while the double-acting leg member 8 is kept separated from the object surface 1.

In the first procedure shown in FIG. 28, the second double-acting leg member 203 is strongly pressed against the object surface 1, while the double-acting leg member 8 is separated from the object surface 1.

Figure 29:
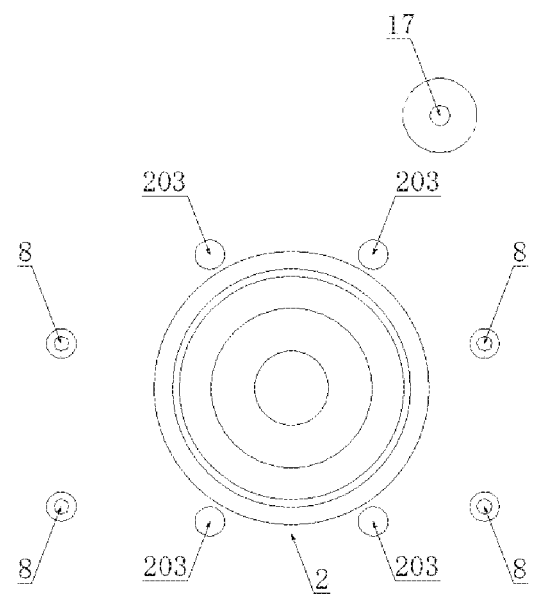
FIG. 29 is a rear view, a bottom view and a partial cross-sectional view showing the action of the device in the second step.
Figure 29:
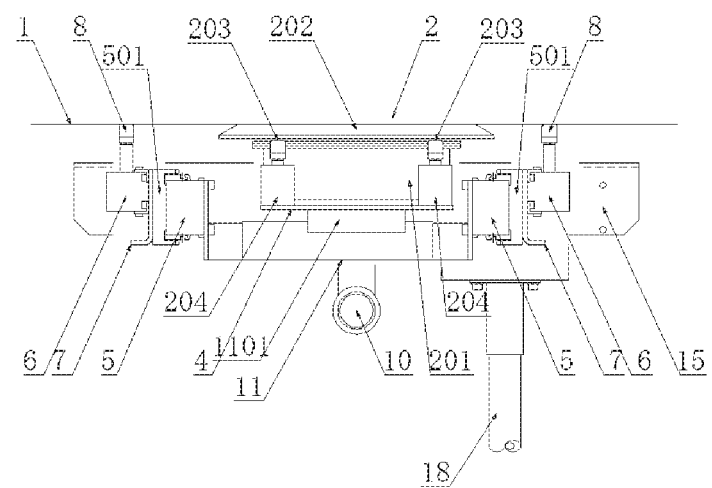

In the second procedure shown in FIG. 29, the second double-acting leg member 203 separates from the object surface 1, while the double-acting leg member 8 is strongly pressed against the object surface 1.

Figure 30:
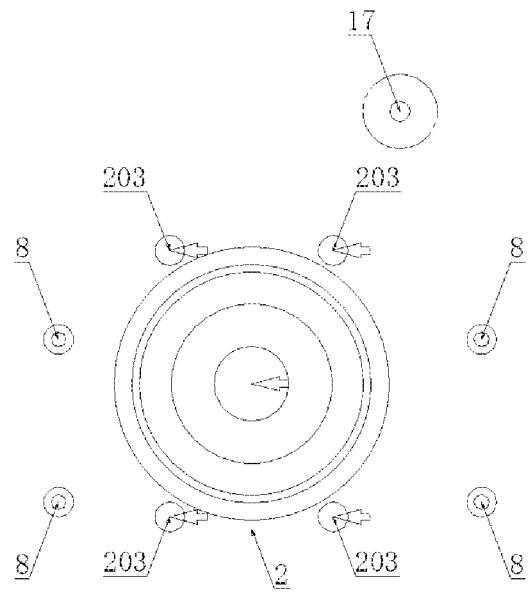
FIG. 30 is a rear view, a bottom view and a partial cross-sectional view showing the action of the device in the third step.
Figure 30:
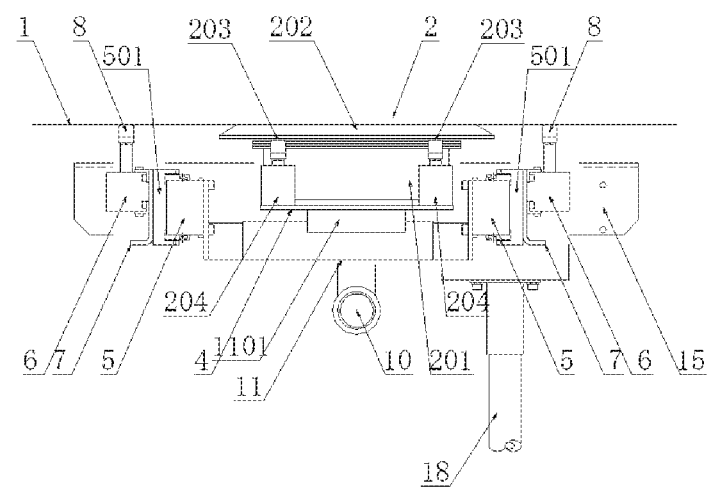

In the third procedure shown in FIG. 30, the negative pressure adhering and traveling device including the second double-acting leg member 203 travels to the left along the object surface 1 in a state in which the device remains attracted to the object surface 1.

In the third procedure shown in FIG. 30, the second double-acting leg member 203 is separated from the object surface 1, while the double-acting leg member 8 is strongly pressed against the object surface 1.

Figure 31:
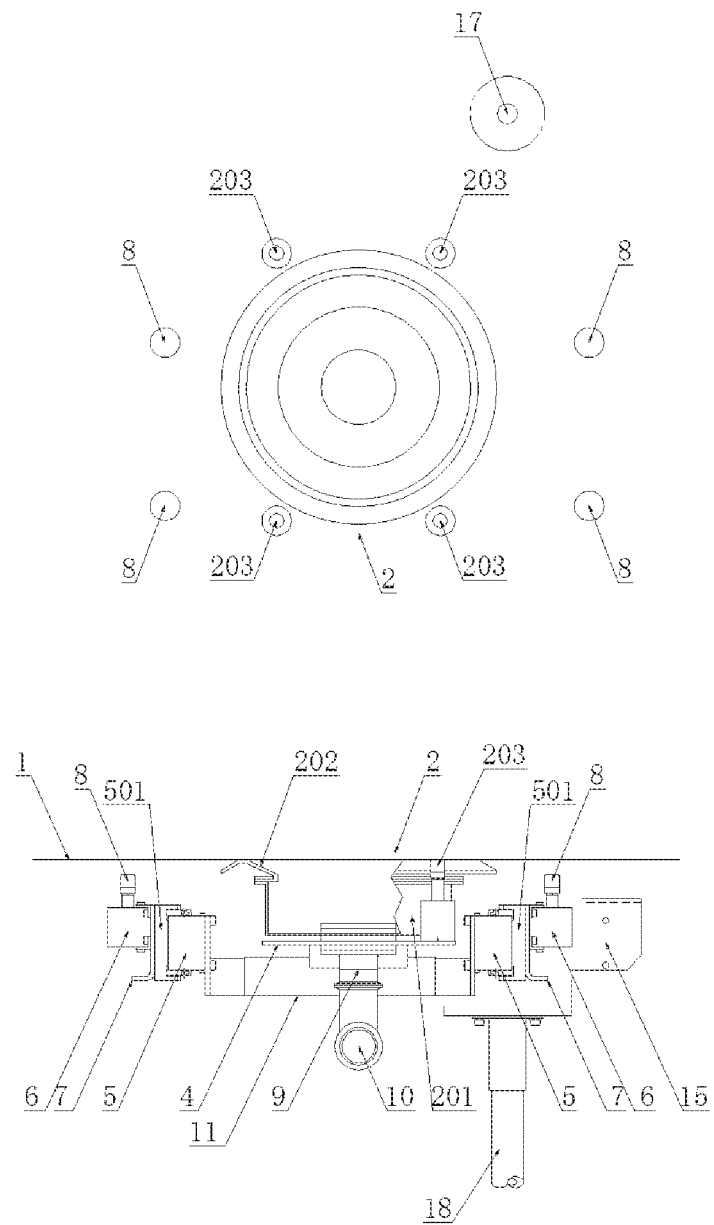
FIG. 31 is a rear view, a bottom view and a partial cross-sectional view showing the action of the device in the fourth step.

In the fourth procedure shown in FIG. 31, the second double-acting leg member 203 is strongly pressed against the object surface 1, while the double-acting leg member 8 is separated from the object surface 1.

When the fourth procedure is completed, the above-described procedures from the first procedure to the fourth procedure are repeated.

As described above, in addition to the function of traveling in the Y-axis direction while working along the object surface, the device of the present invention can also travel in the X-axis direction for changing lanes. Therefore, efficient work can be realized.

In the device shown in FIGS. 14 to 24, when the Y-axis reciprocation unit 5 and the Z-axis reciprocation unit 6 on the left side are allowed to travel and move downward, and the Y-axis reciprocation unit 5 and the Z-axis reciprocation units 6 on the right side are allowed to travel and move upward, for example, the entire device rotationally travels counter-clockwise around the rotary coupling means 9, serving as a central axis, and along the object surface 1.

Upon the rotational traveling, the negative pressure adhering unit 2 does not rotate along the object surface 1 due to the action of the rotary coupling means 9.

Namely, friction force is generated between the negative pressure adhering unit seal 202 and the object surface 1, however, the friction force between the negative pressure adhering unit seal 202 and the object surface 1 does not hinder rotational traveling of the entire device upon the above-mentioned rotational traveling, which is very favorable for achieving rotational traveling with high positioning accuracy.

The above-mentioned device of the preferred embodiment of the second invention related to this invention brings about the following effects.

Namely, in the "device capable of adhering by suction to an object surface and traveling therealong" by using negative pressure as described in claims 4 to 6, since an expensive displacement sensor like a servo motor or a rotary encoder, and an electric control system are not needed, and the configuration and control are simplified, the manufacturing cost can be reduced.

In addition, failures are reduced and the maintenance is facilitated as the configuration and control are simplified.

Further, heavy parts like wheels with a rotary shaft and a bearing, the servo motor with a reduction gear, a transmission mechanism transmitting the rotational driving force of the motor to the wheels, etc., are not needed.

Thus, since the configuration is simple and the whole device is lightweight, the device is easily used and become more convenient.

Furthermore, since positional accuracy during intermittent traveling is improved, work quality can be improved when jetting a surface treatment material etc., or inspection, etc. of the object surface.

Preferred embodiments of the device of the second invention related to this invention are explained hereinbefore, however, various embodiments of the device of this invention other than the above-mentioned preferred embodiments can be conceived according to the scope of the claims of the invention.

In the meantime, the preferred embodiments of the device of this invention have been explained on the premise that the device of this invention exists on the object surface in the atmosphere. However, the device of this invention can also be applied even in water. As for the negative pressure generating means in this case, a water pump or a water-driven ejector can be used instead of a vacuum pump.

The above-mentioned "device capable of adhering to the object surface and traveling therealong" can be conveniently used in various fields: as a cleaning device for removing foreign substances like dirt, rust, degraded coating or aquatic organisms clung to the object surface while adhering to the object surface by using negative pressure or magnetic force and moving along the object surface; or as an inspection device performing inspection like ultrasonic flaw detection of the object surface while adhering to the object surface by using negative pressure or magnetic force and moving along the object surface.

What is claimed is:

1. A device capable of adhering to an object surface and traveling therealong comprising:
    where axes parallel to the object surface and perpendicular to each other are referred to as X-axis and Y-axis, and an axis perpendicular to the object surface is referred to as Z-axis;
    an adhering unit adhering to the object surface by the action of negative pressure;
    Y-axis reciprocation units respectively arranged on right and left sides of the adhering unit with respect to the moving direction thereof, and capable of reciprocating optionally in a front-back direction of the moving direction, that is, in the Y-axis direction;
    Z-axis reciprocation units mounted on each of the Y-axis reciprocation units and capable of reciprocating optionally in the direction intersecting with the object surface, that is, in the Z-axis direction;
    double-acting leg members respectively mounted on the Z-axis reciprocation units, and capable of reciprocating optionally in the direction intersecting with the object surface, that is, in the Z-axis direction;
    second Z-axis reciprocation units mounted on the adhering unit and capable of reciprocating optionally in the Z-axis direction; and
    second double-acting leg members respectively mounted on the second Z-axis reciprocation units, and capable of reciprocating optionally in the Z-axis direction;
    wherein when the device travels in the Y-axis direction along the object surface adhering to the object surface;

as a first step; while maintaining the default state that the double-acting leg members are separated from the object surface by the action of the Z-axis reciprocation units, the second double-acting leg members are strongly pressed against the object surface by the action of the second Z-axis reciprocation units; the double-acting leg members is moved in the traveling direction of the device by driving the Y-axis reciprocation units;

as a second step, the double-acting leg members are strongly pressed against the object surface by the action of the Z-axis reciprocation units, and the second double-acting leg members are separated from the object surface by the action of the second Z-axis reciprocation units;

as a third step, the adhering unit adhering to the object surface is moved in the traveling direction of the device by driving the Y-axis reciprocation units while maintaining the state that the double-acting leg members are strongly pressed against the object surface and the second double-acting leg members are separated from the object surface;

as a fourth step, the double-acting leg members are separated from the object surface by the action of the Z-axis reciprocation units and the second double-acting leg members are strongly pressed against the object surface by the action of the second Z-axis reciprocation units, thus it is returned to the state immediately before the first step, that is, it is returned to the default state; and the operations of the first to fourth steps are repeated thereafter, by which the device adhering to the object surface travels intermittently therealong.

2. A device capable of adhering to an object surface and traveling therealong comprising:

where axes parallel to the object surface and perpendicular to each other are referred to as X-axis and Y-axis, and an axis perpendicular to the object surface is referred to as Z-axis;

an adhering unit adhering to the object surface by the action of negative pressure;

Y-axis reciprocation units respectively arranged on right and left sides of the adhering unit with respect to the moving direction thereof, and capable of reciprocating optionally in a front-back direction of the moving direction, that is, in the Y-axis direction;

Z-axis reciprocation units mounted on each of the Y-axis reciprocation units and capable of reciprocating optionally in the direction intersecting with the object surface, that is, in the Z-axis direction;

double-acting leg members respectively mounted on the Z-axis reciprocation units, and capable of reciprocating optionally in the direction intersecting with the object surface, that is, in the Z-axis direction;

second Z-axis reciprocation units mounted on the adhering unit and capable of reciprocating optionally in the Z-axis direction;

second double-acting leg members respectively mounted on the second Z-axis reciprocation units, and capable of reciprocating optionally in the Z-axis direction;

a working device working on the object surface to jet a surface treating material, etc., or an inspection device obtaining information from the object surface to inspect the object surface, etc.; and a second X-axis reciprocation unit allowing the working device or the inspection device to reciprocate along the object surface in the direction intersecting with the moving direction of the adhering unit;

wherein, when the working device or the inspection device performs scanning along the object surface and the device travels in the Y-axis direction along the object surface adhering to the object surface;

as a first step; while maintaining the default state that the double-acting leg members are separated from the object surface by the action of the Z-axis reciprocation units, and the second double-acting leg members are strongly pressed against the object surface by the action of the second Z-axis reciprocation units; the working device or the inspection device performs outward or homeward scanning by the action of the second X-axis reciprocation unit, and at the same time, the double-acting leg members is moved in the traveling direction of the device by driving the Y-axis reciprocation units;

as a second step, the double-acting leg members are strongly pressed against the object surface by the action of the Z-axis reciprocation units, and the second double-acting leg members are separated from the object surface by the action of the second Z-axis reciprocation units;

as a third step, the adhering unit, and the working device or the inspection device are moved in the traveling direction of the device by driving the Y-axis reciprocation units while maintaining the state that the double-acting leg members are strongly pressed against the object surface and the second double-acting leg members are separated from the object surface;

as a fourth step, the double-acting leg members are separated from the object surface by the action of the Z-axis reciprocation units and the second double-acting leg members are strongly pressed against the object surface by the action of the second Z-axis reciprocation units, thus it is returned to the state immediately before the first step, that is, it is returned to the default state; and the operations of the first to fourth steps are repeated thereafter, by which the device adhering to the object surface travels intermittently along the object surface while working on the object surface or obtaining information from the same.

3. The device capable of adhering to the object surface and traveling therealong described in claim 1 comprising: a coupling means to couple the adhering unit with the two Y-axis reciprocation units including a rotary coupling means having an axis of rotation perpendicular to the object surface so that the two Y-axis reciprocation units can rotate around the coupling means and along the object surface.

4. The device capable of adhering to the object surface and traveling therealong described in claim 2 comprising: a coupling means to couple the adhering unit with the two Y-axis reciprocation units including a rotary coupling means having an axis of rotation perpendicular to the object surface so that the two Y-axis reciprocation units can rotate around the coupling means and along the object surface.

5. A device capable of adhering to an object surface and traveling therealong comprising:

where axes parallel to the object surface and perpendicular to each other are referred to as X-axis and Y-axis, and an axis perpendicular to the object surface is referred to as Z-axis;

an adhering unit adhering to the object surface by the action of negative pressure;

Y-axis reciprocation units respectively arranged on right and left sides of the adhering unit with respect to the moving direction thereof, and capable of reciprocating optionally in a front-back direction of the moving direction, that is, in the Y-axis direction;

Z-axis reciprocation units mounted on each of the Y-axis reciprocation units and capable of reciprocating optionally in the direction intersecting with the object surface, that is, in the Z-axis direction;

double-acting leg members respectively mounted on the Z-axis reciprocation units, and capable of reciprocating optionally in the direction intersecting with the object surface, that is, in the Z-axis direction;

second Z-axis reciprocation units mounted on the adhering unit and capable of reciprocating optionally in the Z-axis direction;

second double-acting leg members respectively mounted on the second Z-axis reciprocation units, and capable of reciprocating optionally in the Z-axis direction; and X-axis reciprocation units connecting the left Y-axis reciprocation unit to the right Y-axis reciprocation unit, and the reciprocating members of the Y-axis reciprocation units respectively mounted on the adhering unit, and capable of reciprocating the adhering unit optionally in the X-axis direction;

wherein, when the device travels in the Y-axis direction along the object surface adhering to the object surface;

as a first step; while maintaining the default state that the double-acting leg members are separated from the object surface by the action of the Z-axis reciprocation units, the second double-acting leg members are strongly pressed against the object surface by the action of the second Z-axis reciprocation units; the double-acting leg members is moved in the traveling direction of the device by driving the Y-axis reciprocation units;

as a second step, the double-acting leg members are strongly pressed against the object surface by the action of the Z-axis reciprocation units, and the second double-acting leg members are separated from the object surface by the action of the second Z-axis reciprocation units;

as a third step, the adhering unit adhering to the object surface is moved in the traveling direction of the device by driving the Y-axis reciprocation units while maintaining the state that the double-acting leg members are strongly pressed against the object surface and the second double-acting leg members are separated from the object surface;

as a fourth step, the double-acting leg members are separated from the object surface by the action of the Z-axis reciprocation units and the second double-acting leg members are strongly pressed against the object surface by the action of the second Z-axis reciprocation units, thus it is returned to the state immediately before the first step, that is, it is returned to the default state; and the operations of the first to fourth steps are repeated thereafter, by which the device adhering to the object surface travels intermittently therealong;

wherein, when the device travels in the X-axis direction along the object surface adhering to the object surface;

as a first step; while maintaining the default state that the double-acting leg members are separated from the object surface by the action of the Z-axis reciprocation units, the second double-acting leg members are strongly pressed against the object surface by the action of the second Z-axis reciprocation units; the double-acting leg members is moved in the traveling direction of the device by driving the X-axis reciprocation units;

as a second step, the double-acting leg members are strongly pressed against the object surface by the action of the Z-axis reciprocation units, and the second double-acting leg members are separated from the object surface by the action of the second Z-axis reciprocation units;

as a third step, the adhering unit adhering to the object surface is moved in the traveling direction of the device by driving the X-axis reciprocation units while maintaining the state that the double-acting leg members are strongly pressed against the object surface and the second double-acting leg members are separated from the object surface;

as a fourth step, the double-acting leg members are separated from the object surface by the action of the Z-axis reciprocation units and the second double-acting leg members are strongly pressed against the object surface by the action of the second Z-axis reciprocation units, thus it is returned to the state immediately before the first step, that is, it is returned to the default state; and the operations of the first to fourth steps are repeated thereafter, by which the device adhering to the object surface travels intermittently therealong.

6. A device capable of adhering to an object surface and traveling therealong comprising:

where axes parallel to the object surface and perpendicular to each other are referred to as X-axis and Y-axis, and an axis perpendicular to the object surface is referred to as Z-axis;

an adhering unit adhering to the object surface by the action of negative pressure;

Y-axis reciprocation units respectively arranged on right and left sides of the adhering unit with respect to the moving direction thereof, and capable of reciprocating optionally in a front-back direction of the moving direction, that is, in the Y-axis direction;

Z-axis reciprocation units mounted on each of the Y-axis reciprocation units and capable of reciprocating optionally in the direction intersecting with the object surface, that is, in the Z-axis direction;

double-acting leg members respectively mounted on the Z-axis reciprocation units, and capable of reciprocating optionally in the direction intersecting with the object surface, that is, in the Z-axis direction;

second Z-axis reciprocation units mounted on the adhering unit and capable of reciprocating optionally in the Z-axis direction;

second double-acting leg members respectively mounted on the second Z-axis reciprocation units, and capable of reciprocating optionally in the Z-axis direction;

X-axis reciprocation units connecting the left Y-axis reciprocation unit to the right Y-axis reciprocation unit, and the reciprocating members of the Y-axis reciprocation units respectively mounted on the adhering unit, and capable of reciprocating the adhering unit optionally in the X-axis direction;

a working device working on the object surface to jet a surface treating material, etc., or an inspection device obtaining information from the object surface to inspect the object surface, etc.; and a second X-axis reciprocation unit allowing the working device or the inspection device to reciprocate along the object surface in the direction intersecting with the moving direction of the adhering unit;

wherein, when the working device or the inspection device performs scanning along the object surface and the device travels in the Y-axis direction along the object surface adhering to the object surface;

as a first step; while maintaining the default state that the double-acting leg members are separated from the object surface by the action of the Z-axis reciprocation units, the second double-acting leg members are strongly pressed against the object surface by the action of the second Z-axis reciprocation units; the working device or the inspection device performs outward or homeward scanning by the action of the second X-axis reciprocation unit, and at the same time, the double-acting leg members is moved in the traveling direction of the device by driving the Y-axis reciprocation units;

as a second step, the double-acting leg members are strongly pressed against the object surface by the action of the Z-axis reciprocation units, and the second double-acting leg members are separated from the object surface by the action of the second Z-axis reciprocation units;

as a third step, the adhering unit, and the working device or the inspection device are moved in the traveling direction of the device by driving the Y-axis reciprocation units while maintaining the state that the double-acting leg members are strongly pressed against the object surface and the second double-acting leg members are separated from the object surface;

as a fourth step, the double-acting leg members are separated from the object surface by the action of the Z-axis reciprocation units and the second double-acting leg members are strongly pressed against the object surface by the action of the second Z-axis reciprocation units, thus it is returned to the state immediately before the first step, that is, it is returned to the default state; and the operations of the first to fourth steps are repeated thereafter, by which the device adhering to the object surface travels intermittently along the object surface while working on the object surface or obtaining information from the same.

7. The device capable of adhering to the object surface and traveling therealong described in claim 5, comprising: a coupling means to couple the adhering unit with the two Y-axis reciprocation units including a rotary coupling means having an axis of rotation perpendicular to the object surface so that the two Y-axis reciprocation units can rotate around the coupling means and along the object surface.

8. The device capable of adhering to the object surface and traveling therealong described in claim 6 comprising: a coupling means to couple the adhering unit with the two Y-axis reciprocation units including a rotary coupling means having an axis of rotation perpendicular to the object surface so that the two Y-axis reciprocation units can rotate around the coupling means and along the object surface.

\* \* \* \* \*